(12) United States Patent
Kimura et al.

(10) Patent No.: US 7,957,249 B2
(45) Date of Patent: Jun. 7, 2011

(54) OBJECTIVE LENS, OPTICAL PICKUP APPARATUS AND OPTICAL INFORMATION RECORDING AND/OR REPRODUCING APPARATUS

(75) Inventors: Tohru Kimura, Hachioji (JP); Eiji Nomura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/552,189

(22) Filed: Sep. 1, 2009

(65) Prior Publication Data

US 2009/0316563 A1 Dec. 24, 2009

Related U.S. Application Data

(63) Continuation of application No. 11/348,477, filed on Feb. 7, 2006, now Pat. No. 7,660,225.

(30) Foreign Application Priority Data

Feb. 10, 2005 (JP) .................................. 2005-034814

(51) Int. Cl.
*G11B 7/00* (2006.01)
(52) U.S. Cl. ............................. 369/112.01; 369/112.23
(58) Field of Classification Search ............. 369/112.01, 369/112.02, 44.23, 44.24, 112.23, 112.03, 369/112.04, 112.08, 112.1, 112.13, 112.15, 369/112.2, 112.26
See application file for complete search history.

(56) References Cited

U.S. PATENT DOCUMENTS

| 6,785,215 B2 * | 8/2004 | Yamanouchi et al. ... 369/112.23 |
| 7,366,078 B2 | 4/2008 | Arai et al. |
| 7,369,481 B2 | 5/2008 | Kimura et al. |
| 2002/0135891 A1 | 9/2002 | Kimura et al. |
| 2003/0053223 A1 | 3/2003 | Takeuchi et al. |
| 2004/0037204 A1 | 2/2004 | Takeuchi |

FOREIGN PATENT DOCUMENTS

| EP | 1 276 104 A2 | 1/2003 |
| EP | 1 528 546 A2 | 5/2005 |
| JP | 2004-079146 | 3/2004 |

OTHER PUBLICATIONS

European Search Report dated Nov. 6, 2008.
Office Action in related U.S. Appl. No. 11/348,477, mailed Apr. 24, 2009.

* cited by examiner

*Primary Examiner* — Nabil Z Hindi
(74) *Attorney, Agent, or Firm* — Finnegan, Henderson, Farabow, Garrett & Dunner, L.L.P.

(57) ABSTRACT

An objective lens according to the present invention is an objective lens used for an optical pickup apparatus, and the objective lens includes a superimposed structure on a surface of a lens with a power in which a first optical path difference providing structure changing spherical aberration in undercorrected direction when a wavelength of an incident light flux becomes longer, and a second optical path difference providing structure changing spherical aberration in overcorrected direction when a wavelength of an incident light flux becomes longer are superimposed.

32 Claims, 6 Drawing Sheets

OBJECTIVE LENS, OPTICAL PICKUP APPARATUS AND OPTICAL INFORMATION RECORDING AND/OR REPRODUCING APPARATUS

This is a continuation of application Ser. No. 11/348,477, filed Feb. 7, 2006, now U.S. Pat. No. 7,660,225, which claims the benefit of priority from Japanese application No. JP2005-034814, filed on Feb. 10, 2005, both of which are incorporated herein by reference in their entirities.

BACKGROUND OF THE INVENTION

The present invention relates to an objective lens, an optical pickup apparatus and an optical information recording and/or reproducing apparatus, and in particular, to an optical pickup apparatus and an optical information recording and/or reproducing apparatus both being capable of recording and/or reproducing information properly for optical information recording media each being different, by using a light source having a different wavelength, and to an objective lens used for the foregoing.

In recent years, there has been researched and developed rapidly a high density disc system capable of conducting recording and/or reproducing of information (hereinafter, "recording and/or reproducing of information" is also represented by "recording/reproducing of information" or "recording and reproducing of information") by using a violet semiconductor laser having a wavelength of about 400 nm. As an example, in the case of an optical disc conducting recording and/or reproducing of information under specifications of NA 0.85 and light source wavelength 405 nm what is called Blue-ray Disc (hereinafter referred to as BD), information of 23-27 GB per one layer can be recorded for an optical disc with a diameter of 12 cm that is the same as DVD (NA 0.6, light source wavelength 650 nm and storage capacity 4.7 GB) in size, and in the case of an optical disc conducting recording and/or reproducing of information under specifications of NA 0.65 and light source wavelength 405 nm what is called HD DVD (in the other words High Definition DVD and hereinafter referred to as HD), information of 15-20 GB per one layer can be recorded for an optical disc with a diameter of 12 cm. Incidentally, in the case of BD, coma caused by inclination of an optical disc (skew) is increased, thereby, a protective layer is designed to be thinner that that in DVD (thickness is 0.1 mm while that of DVD is 0.6 mm), and an amount of coma caused by skew is reduced. From now on, the optical disc of this kind is called "high density optical disc".

Incidentally, a value of an optical disc player/recorder is not sufficient when it can conduct only recording and/or reproducing of information properly for the high density optical disc of this type. When it is considered that DVDs wherein various types of information are recorded are available on the market presently, only conducting recording and/or reproducing of information for the high density optical disc is not sufficient, and a product value as an optical disc player/recorder for the high density optical disc is enhanced when recording and/or reproducing of information can be conducted properly also for DVD owned by a user. From such background, an optical pickup apparatus installed in an optical disc player/recorder for a high density optical disc is required to have capability to conduct recording and/or reproducing of information properly while keeping compatibility for both of the high density optical disc and DVD.

As a method to conduct recording and/or reproducing of information properly while keeping compatibility for both of the high density optical disc and DVD, there is considered a method to switch selectively an optical system for a high density optical disc and an optical system for DVD in accordance with recording density of the optical disc for which recording and/or reproducing of information is conducted. However, this method requires a plurality of optical systems, thereby, this method is disadvantageous for downsizing, and cost increase is caused.

For simplifying the structure of the optical pickup apparatus and realizing low cost, therefore, it is preferable to reduce extremely the number of optical parts constituting the optical pickup apparatus by standardizing an optical system for a high density optical disc an optical system for DVD, even in the case of the optical pickup apparatus having compatibility. It is most advantageous for simplification of the structure of the optical pickup apparatus and for low cost to standardize an objective lens arranged to face an optical disc and thereby to make this objective lens to be a single lens. Incidentally, as a common objective lens for plural types of optical discs using light fluxes with different wavelengths each other when recording and/or reproducing of information, there is known an objective lens that has on its surface a diffractive structure having wavelength-dependency of spherical aberration and corrects spherical aberration caused by a difference of a recording/reproducing wavelength and of a protective layer of the optical discs, by utilizing the wavelength-dependency of spherical aberration.

In Patent Document 1, there is disclosed an objective lens of a single lens structure that can conduct recording and/or reproducing of information on a compatible basis for a high density optical disc and DVD.

(Patent Document 1) TOKUKAI No. 2004-79146

The objective lens disclosed by Patent Document 1 is one that has a diffractive structure that generates secondary diffracted light for a violet laser light flux and generates the first order diffracted light for a red laser light flux and corrects spherical aberration caused by a difference of protective layer thickness between a high density optical disc and DVD, by diffracting actions of the diffractive structure. However, this objective lens has two problems mentioned below, although it can be manufactured at low cost because of a single lens structure.

One of the problems is that wavelength-dependency of spherical aberration generated by the diffractive structure is great. In this case, it is impossible to use a laser light source wherein an emission wavelength is deviated from a design wavelength, and a laser light source needs to be selected, which increases manufacturing cost for the optical pickup apparatus. An angle of diffraction of the diffracted light is expressed by "diffraction order×wavelength/diffraction pitch".

It is necessary to give a difference between angles of diffraction for working wavelengths (where, the working wavelength is also represented by recording/reproducing wavelength hereinafter), for realizing compatibility between optical information recording media each having a different working wavelength by utilizing diffracting actions. "The problem of selection of laser light source" stated above is caused by using the diffractive structure wherein a value of "diffraction order×wavelength" is substantially the same between working wavelengths for a high density optical disc and DVD. In the objective lens disclosed by Patent Document 1, a ratio of "diffraction order×wavelength" between a violet laser light flux and a red laser light flux is 810/655=1.24 to be close to 1 (provided that a unit of wavelength is nm), and therefore, a diffraction pitch needs to be small for obtaining a necessary difference of an angle of diffraction or correcting spherical aberration caused by a difference of protective layer thickness between a high density optical information recording medium and DVD. Accordingly, wavelength-dependency of spherical aberration for the diffractive structure grows greater, resulting in elicitation of "the problem of selection of laser light source" mentioned above.

Another problem is that vignetting of a light flux on the step portion is caused by formation of a diffractive structure on a highly inclined optical surface, and transmittance is declined by insufficient transfer of a microscopic structure such as a corner section of a ring-shaped zone in the diffractive structure, thus, sufficient efficiency for using light cannot be obtained. Since an inclination of an optical surface grows greater as a numerical aperture of an objective lens grows greater, a decline of the transmittance becomes more remarkable in BD that employs an objective lens having a numerical aperture of 0.85.

SUMMARY OF THE INVENTION

The present invention is one attained in view of the problems mentioned above, and one of an object of the present invention is to provide an objective lens that can conduct recording and/or reproducing of information properly for various types of optical information recording media by using light fluxes with different wavelengths, and has small wavelength-dependency for spherical aberration, an optical pickup apparatus employing the aforesaid objective lens and an optical information recording and/or reproducing apparatus in which the aforesaid optical pickup apparatus is installed. Another of an object of the present invention is to provide an objective lens of a single lens structure that can conduct recording and/or reproducing of information properly for various types of optical information recording media, and has small wavelength-dependency for spherical aberration and has high transmittance, an optical pickup apparatus employing the aforesaid objective lens and an optical information recording and/or reproducing apparatus in which the aforesaid optical pickup apparatus is installed.

To solve the above-described problems, an objective lens according to the present invention is an objective lens for use in an optical pickup apparatus, including a superimposed structure on a surface of a lens with a power in which a first optical difference providing structure and a second difference providing structure with a predefined property are superimposed.

DETAILED DESCRIPTION OF THE PREFERRED EMBODIMENT

Figure 1:
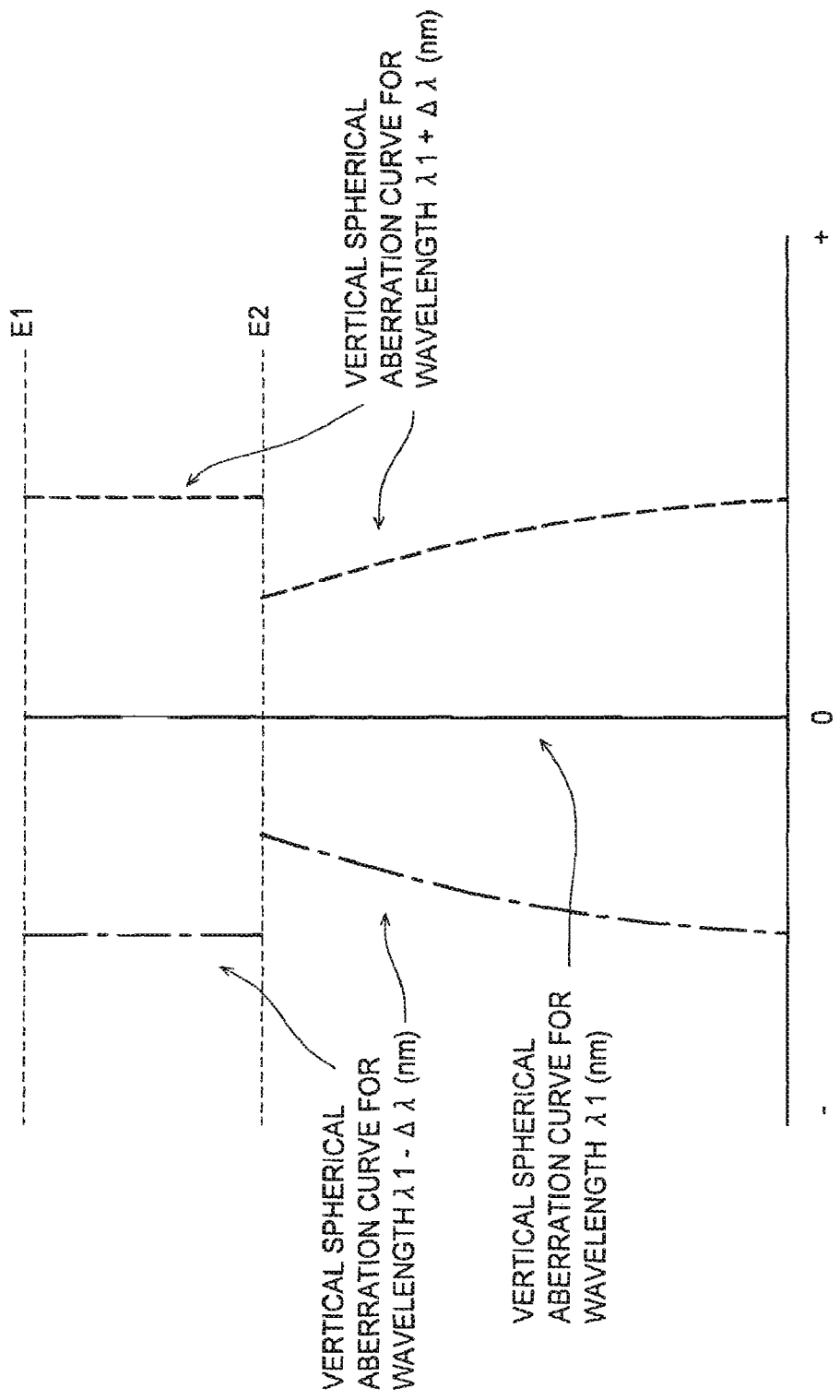
FIG. 1 is a schematic view of vertical spherical aberration diagram of an objective lens.

Preferred structures to attain the aforesaid object of the invention will be explained as follows.

An objective lens described in Structure 1 is one that is used for an optical pickup apparatus and includes: at least one lens having a power; and a superimposed structure on a surface of the lens. In the superimposed structure, a first optical path difference providing structure changing spherical aberration in under-corrected direction when a wavelength of an incident light flux becomes longer, and a second optical path difference providing structure changing spherical aberration in over-corrected direction when a wavelength of an incident light flux becomes longer are superimposed.

According to the objective lens described in Structure 2, in the objective lens of Structure 1, the surface of the lens includes: an area where the superimposed structure is formed and an area where the superimposed structure is not formed.

According to the objective lens described in Structure 3, in the objective lens of Structure 1 or 2, the area where the superimposed structure is not formed is an aspheric surface.

According to the objective lens described in Structure 4, in the objective lens of any one of Structures 1 to 3, the surface of the lens includes: a central area including an optical axis and a peripheral area surrounding the central area, and the superimposed structure is formed on the central area.

According to the objective lens described in Structure 5, in the objective lens of any one of Structures 1 to 4, the surface of the lens faces a light source side when the lens is provided in the optical pickup apparatus.

According to the objective lens described in Structure 6, in the objective lens of any one of Structures 1 to 5, the surface of the lens is a curvature surface.

According to the objective lens described in Structure 7, in the objective lens of any one of Structures 1 to 6, the other surface of the lens is an aspheric surface.

According to the objective lens described in Structure 8, in the objective lens of any one of Structures 1 to 7, when an information recording medium is arranged so as to face the optical pickup apparatus, the lens is arranged at closest position to the information recording medium.

According to the objective lens described in Structure 9, in the objective lens of any one of Structures 1 to 8, the objective lens is a single lens structure composed of the lens.

According to the objective lens described in Structure 10, in the objective lens of any one of Structures 1 to 9, the objective lens is used for the optical pickup apparatus, the optical pickup apparatus including: the first light source for emitting the first light flux with a first wavelength of $\lambda 1$; the second light source for emitting the second light flux with a second wavelength of $\lambda 2$; a light converging optical system comprising an objective lens; a photodetector. The optical pickup apparatus records and/or reproduces information for the first optical information recording medium having a protective layer with a thickness of t1 using the first light flux with the first wavelength $\lambda 1$ emitted by the first light source, and records and/or reproduces information for the second optical information recording medium having a protective layer with a thickness of t2 (t1$\leqq$t2) using the second light flux with the second wavelength $\lambda 2$ ($\lambda 1<\lambda 2$) emitted by the second light source.

According to the objective lens described in Structure 11, in the objective lens of any one of Structures 1 to 10, the first optical path difference providing structure is a diffractive structure.

According to the objective lens described in Structure 12, in the objective lens of Structure 8, the first optical path difference providing structure is a diffractive structure in which a diffraction order providing a maximum diffraction efficiency for the first light flux entering thereon, is same to a diffraction order providing a maximum diffraction efficiency for the second light flux entering thereon, and the second optical path difference providing structure is a phase structure providing a same amount of optical path difference to each of the first light flux and the second light flux.

According to the objective lens described in Structure 13, in the objective lens of Structure 12, one of ring-shaped zones of the phase structure comprises an integer number being equal to or more than one of ring-shaped zones of the diffractive structure.

According to the objective lens described in Structure 14, in the objective lens of Structure 12 or 13, the diffraction order is one and a blaze wavelength $\lambda B$ of the diffractive structure satisfies the following expression (1).

$$\lambda 1 < \lambda B < \lambda 2 \tag{1}$$

The objective lens described in Structure 15, in the objective lens of Structure 12, satisfies the following expressions (2) and (3).

$$380 \text{ nm} < \lambda 1 < 420 \text{ nm} \tag{2}$$

$$630 \text{ nm} < \lambda 2 < 680 \text{ nm} \tag{3}$$

According to the objective lens described in Structure 16, in the objective lens of Structure 15, when NA1 is a numerical aperture of the objective lens for recording or reproducing information on the first optical information recording medium and NA2 is a numerical aperture of the objective lens for recording or reproducing information on the second optical information recording medium, an area within the numerical aperture NA2 comprises the superimposed structure, and a blaze wavelength $\lambda B$ of the diffractive structure, the numerical aperture NA1, and the numerical aperture NA2 satisfy the following expressions (4) and (5).

$$1.15 \times \lambda 1 < \lambda B < 0.85 \times \lambda 2 \tag{4}$$

$$NA2/NA1 < 0.8 \tag{5}$$

According to the objective lens described in Structure 17, in the objective lens of Structure 15 or 16, the same amount of optical path difference is substantially 5 times as longer as the first wavelength $\lambda 1$ for the first light flux, and is substantially 3 times as longer as the second wavelength $\lambda 2$ for the second light flux.

According to the objective lens described in Structure 18, in the objective lens of any one of Structures 11 to 17, the diffractive structure comprises a blaze structure whose direction switches at least one time from a negative direction to a positive direction at a farther position from an optical axis.

According to the objective lens described in Structure 19, in the objective lens of Structures 11 to 17, the diffractive structure comprises a blaze structure with a positive direction.

According to the objective lens described in Structure 20, in the objective lens of Structure 10, the first optical path difference providing structure is a diffractive structure in which a diffraction order providing a maximum diffraction efficiency for the first light flux entering thereon, is different from a diffraction order providing a maximum diffraction efficiency for the second light flux entering thereon, and the second optical path difference providing structure is a phase structure providing a same optical path difference to each of the first light flux and the second light flux.

According to the objective lens described in Structure 21 in the objective lens of Structure 20, the diffraction order providing the maximum diffraction efficiency for the first light flux is 3 and the diffraction order providing a maximum diffraction efficiency for the second light flux is 2.

According to the objective lens described in Structure 22, in the objective lens of Structure 20 or 21, the same optical path difference is substantially 5 times as longer as the first wavelength $\lambda 1$ for the first light flux, and is substantially 3 times as longer as the second wavelength $\lambda 2$ for the second light flux.

According to the objective lens described in Structure 23, in the objective lens of any one of Structures 1 to 10, the second optical path difference providing structure is a diffractive structure.

According to the objective lens described in Structure 24 in the objective lens of Structure 23, the first optical path difference providing structure is a diffractive structure in which a diffraction order providing a maximum diffraction efficiency for the first light flux entering thereon, is different from a diffraction order providing a maximum diffraction efficiency for the second light flux entering thereon, and the second optical path difference providing structure is a phase structure providing a same optical path difference to each of the first light flux and the second light flux.

According to the objective lens described in Structure 25, in the objective lens of Structure 24, the diffraction order providing the maximum diffraction efficiency for the first light flux is 2 and the diffraction order providing a maximum diffraction efficiency for the second light flux is 1.

According to the objective lens described in Structure 26, in the objective lens of Structure 24 or 25, the same optical path difference is substantially 5 times as longer as the first wavelength $\lambda 1$ for the first light flux, and is substantially 3 times as longer as the second wavelength $\lambda 2$ for the second light flux.

According to the objective lens described in Structure 27, in the objective lens of any one of Structures 1 to 26, the lens is a glass lens.

According to the objective lens described in Structure 28, in the objective lens of any one of Structures 1 to 26, the lens is formed by cementing a resin layer comprising the superimposed structure on a glass element.

The objective lens described in Structure 29 is an objective lens for use in an optical pickup apparatus, and includes: a first light source for emitting a first light flux with a first wavelength $\lambda 1$; a second light source for emitting a second light flux with a second wavelength $\lambda 2$; a converging optical system comprising an objective lens; and a photodetector. The optical pickup apparatus reproduces and/or records information for a first optical information recording medium having a protective layer with a thickness t1 by using the first light flux with the first wavelength $\lambda 1$ emitted by the first light source, and the optical pickup apparatus reproduces and/or records information for a second optical information recording medium having a protective layer with a thickness t2 ($t1 \leq t2$) by using the second light flux with the second wavelength $\lambda 2$ ($\lambda 1 < \lambda 2$) emitted by the second light source. The objective lens includes: an optical surface having at least two regions including a central area including an optical axis; and a peripheral area surrounding the central area. The objective lens has a single lens structure. The central area includes a diffractive structure in which a diffraction order providing a maximum efficiency for each of the first light flux and the second light flux is a same each other, and a phase structure providing a same amount of optical path difference for each of the first light flux and the second light flux.

Herein, "phase structure" described in the specification means a general term of a structure having a plurality of steps extending along the optical axis and providing a optical path difference to an incident light flux between the steps. The optical path difference provided by the steps to the incident light flux may be an integer times of the wavelength of the incident light flux or may be a non-integer times of the wavelength of the incident light flux.

Further, "optical path difference structure" in the present invention includes a phase difference structure including the above-described phase structure and a diffractive structure.

Figure 2:
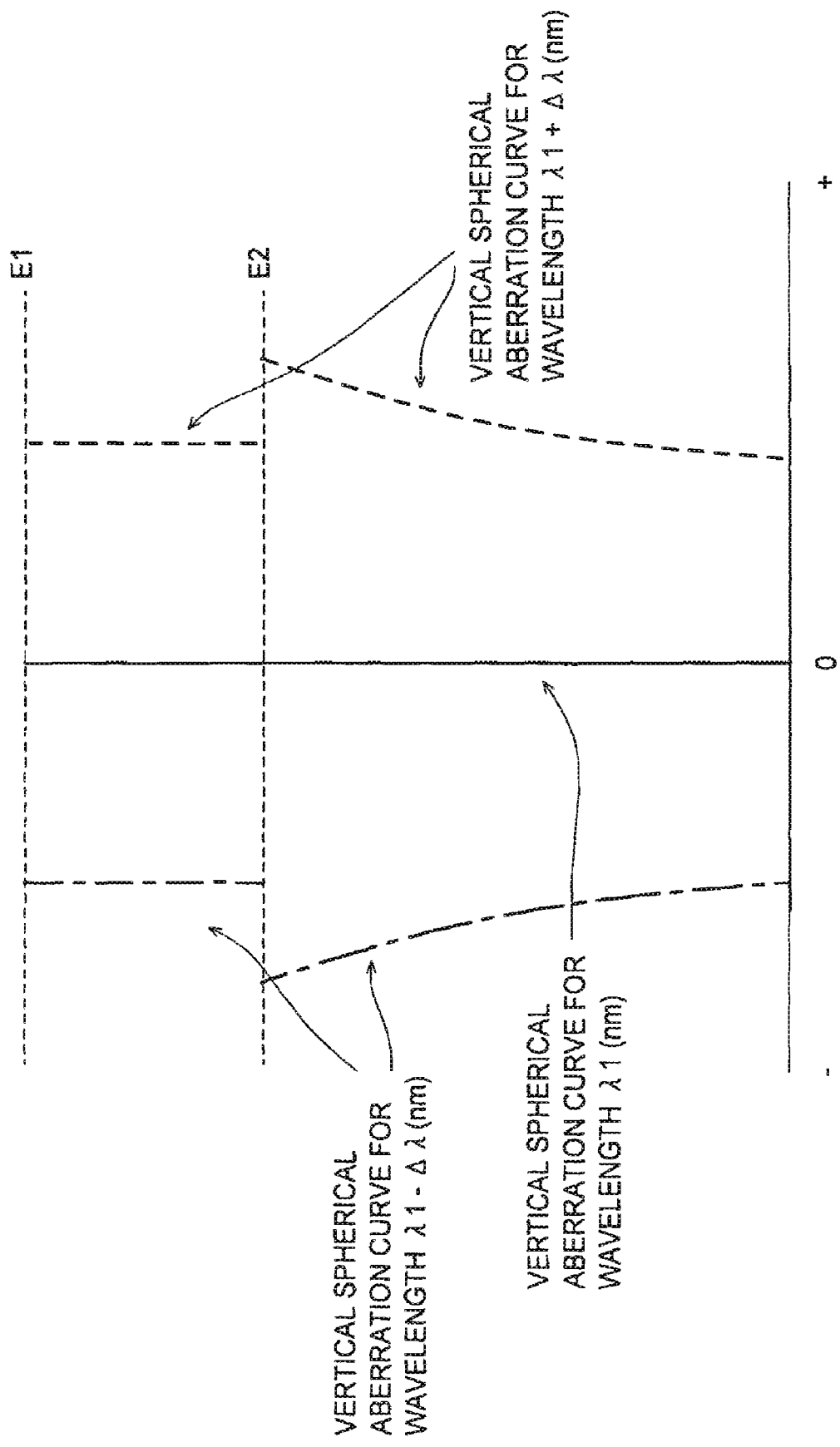
FIG. 2 is a schematic view of vertical spherical aberration diagram of an objective lens.
Figure 3:
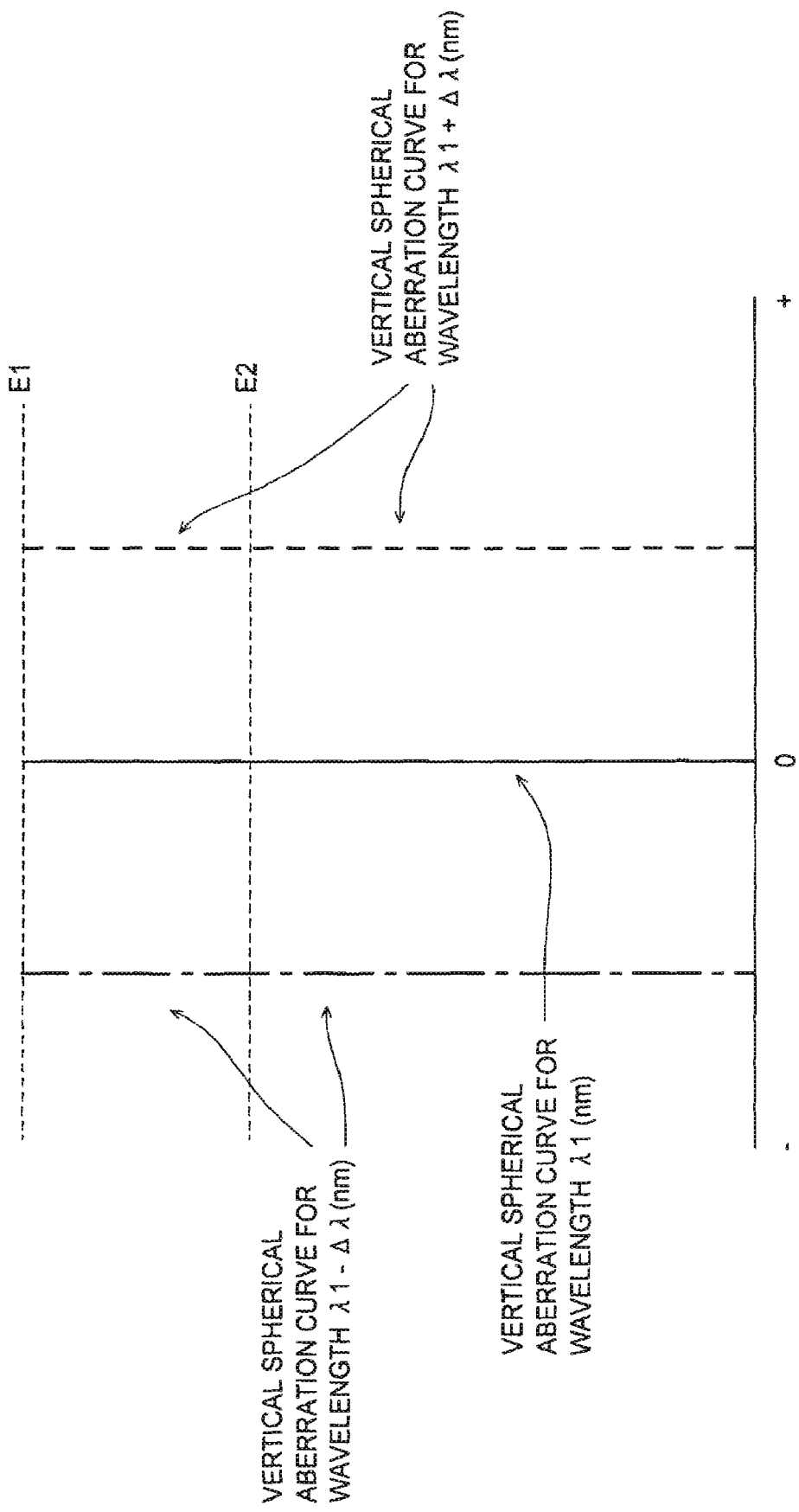
FIG. 3 is a schematic view of vertical spherical aberration diagram of an objective lens.

A concrete example is described below for simply instructing a way of thinking to reach to suggest the objective lens of the invention. However, it does not limit the scope of the present invention. Each of FIGS. 1-3 is a schematic view of vertical spherical aberration diagram of an objective lens. In spherical aberration shown in each of FIGS. 1-3 wherein an origin is a position of a paraxial image point, let it be assumed that "under corrected" represents an occasion to intersect an optical axis on this side of the paraxial image point (left side of the origin in the drawing, namely, the side closer to the objective lens), and "over corrected" represents an occasion to intersect an optical axis at the position farther than the paraxial image point (right side of the origin in the drawing, namely, the side farther from the objective lens). In this case, an explanation is given by using BD as an example of the first optical information recording medium and by using DVD as an example of the second optical information recording medium. Pupil coordinate E2 on the axis of ordinates corresponds to a numerical aperture of DVD, and E1 corresponds to a numerical aperture of BD.

First, there is considered an occasion wherein only a diffractive structure is formed on a central area (range of pupil coordinates 0-E2) on an optical surface of the objective lens, for correcting spherical aberration caused by a difference of protective layer thickness between BD and DVD and/or spherical aberration caused by a difference of wavelength of working light flux. FIG. 1 is a vertical spherical aberration diagram in that case.

As shown with solid lines in FIG. 1, let it be assumed that, when a light flux with wavelength $\lambda 1$ passes, a value of spherical aberration is zero independently of the position from the optical axis. Since the diffractive structure formed on the central area is one for correcting spherical aberration caused by a protective layer thickness difference between BD and DVD, it has characteristics to change the spherical aberration in under corrected direction when a wavelength of the incident light flux grows greater and to change the spherical aberration in over corrected direction when a wavelength of the incident light flux becomes shorter.

Therefore, when wavelength $\lambda 1$ grows greater by $\Delta\lambda$ ($\Delta\lambda>0$), spherical aberration is changed in under corrected direction in the central area as shown with dotted lines in FIG. 1, while, when wavelength $\lambda 1$ becomes shorter by $\Delta\lambda$ ($\Delta\lambda>0$), spherical aberration is changed in over corrected direction in the central area as shown with one-dot chain lines in FIG. 1. However, in the range of pupil coordinate E2-E1 representing a spherical area in the example shown in FIG. 1, wavelength-dependency of spherical aberration is small and spherical aberration is constant substantially, because no diffractive structure exists. If the spherical aberration curve becomes discontinuous when a wavelength is changed in this way, higher order spherical aberration components of $5^{th}$ order or more is generated, which is a problem. Due to a manufacturing error, a semiconductor laser used as a light source in an optical pickup apparatus has a wavelength error of about several nanometers between individuals. Though $3^{rd}$ order spherical aberration component generated by the aforesaid wavelength error can be corrected by adjustment of position of a collimator lens in the optical axis direction, higher order spherical aberration is hard to be corrected by just adjusting the position of the collimator along the optical axis. In the objective lens having wavelength-dependency of spherical aberration like those shown in FIG. 1, therefore, it is necessary to select a semiconductor laser because a semiconductor laser deviated from a design wavelength cannot be used, resulting in a fear that no mass production is expected.

For the problems mentioned above, a phase structure having wavelength-dependency of spherical aberration as shown in FIG. 2 was formed on the objective lens in an embodiment of the present invention. FIG. 2 is a vertical spherical aberration diagram wherein only prescribed phase structure is formed on an optical surface of the objective lens. This phase structure makes spherical aberration to be changed in over corrected direction when a wavelength of an incident light flux becomes longer, and makes spherical aberration to be changed in under corrected direction when a wavelength of an incident light flux becomes shorter, and has wavelength-dependency that is opposite to that for the diffractive structure.

By determining properties of the phase structure shown in FIG. 2 to match them to those of the diffractive structure shown in FIG. 1, it is possible to cancel wavelength-dependency of spherical aberration of the diffractive structure. Further, it is also possible to reduce a generation of higher order spherical aberration by providing the continuous spherical aberration even when a light flux with a wavelength of $\lambda 1-\Delta\lambda$ passes and even when a light flux with a wavelength of $\lambda 1+\Delta\lambda$ passes. In this case, by defining a step difference amount of the phase structure so that the phase structure provides an optical path difference having the same phase difference to both of a design wavelength of BD ($\lambda 1$) and a design wavelength of DVD ($\lambda 2$), it is possible to correct wavelength-dependency of spherical aberration for the diffractive structure (which means a spherical aberration change in the case where a wavelength of the incident light flux changes from $\lambda 1$ or $\lambda 2$ within a range of several nanometers, in this case) without changing light-converging characteristics for $\lambda 1$ and $\lambda 2$ by the diffractive structure, even when the diffractive structure is formed. Incidentally, "the same amount of optical path difference" means optical path differences provided the phase structure for the wavelengths $\lambda 1$ and $\lambda 2$ satisfy the following two expressions.

$$a \times 0.9 \times \lambda 1 \leq L1 \leq a \times 1.1 \times \lambda 1$$

$$b \times 0.9 \times \lambda 2 \leq L2 \leq a \times 1.1 \times \lambda 2$$

Where, L1 and L2 are optical path differences for wavelengths $\lambda 1$ and $\lambda 2$ generated in one step in the phase structure respectively, a is an arbitral integer value and b is a positive arbitral integer value and is smaller than a.

Further, a combination of a and b preferably satisfies (a, b)=(5, 3), (10, 6).

In the objective lens of this embodiment, spherical aberration correction at a large pitch (correction of spherical aberration caused by a difference between wavelengths for recording and reproducing and between protective layer thicknesses) is possible, because an amount of step in the diffractive structure is determined so that the diffraction order providing the maximum diffraction efficiency may be the same order for both of the first light flux and the second light flux. Accordingly, the wavelength-dependency of spherical aberration for the diffractive structure does not become too great, and a pitch of the phase structure for correcting it does not become too small, thus, a decline of transmittance caused by an error of the form in each of the diffractive structure and the phase structure can be restrained.

Further, in the objective lens of this embodiment, a diffractive structure and a phase structure each having thereon microscopic steps are formed on the central area of the objective lens where an inclination is relatively small, whereby, a decline of transmittance caused by vignetting of a light flux at step portions and by transfer failure for the microscopic structure can be restrained, and sufficient efficiency for using light can be obtained.

Meanwhile, even when the diffractive structure and the phase structure are formed respectively on different optical surfaces, the same effects as those mentioned above can be obtained. In this case, however, the number of optical surfaces each having possibility of occurrence of a decline of transmittance caused by formal errors is increased to two. By forming the diffractive structure and the phase structure on the same optical surface on a superposition basis as in the objective lens of this embodiment, a decline of transmittance caused by formal errors can be restrained, which is an advantage.

Figure 4:
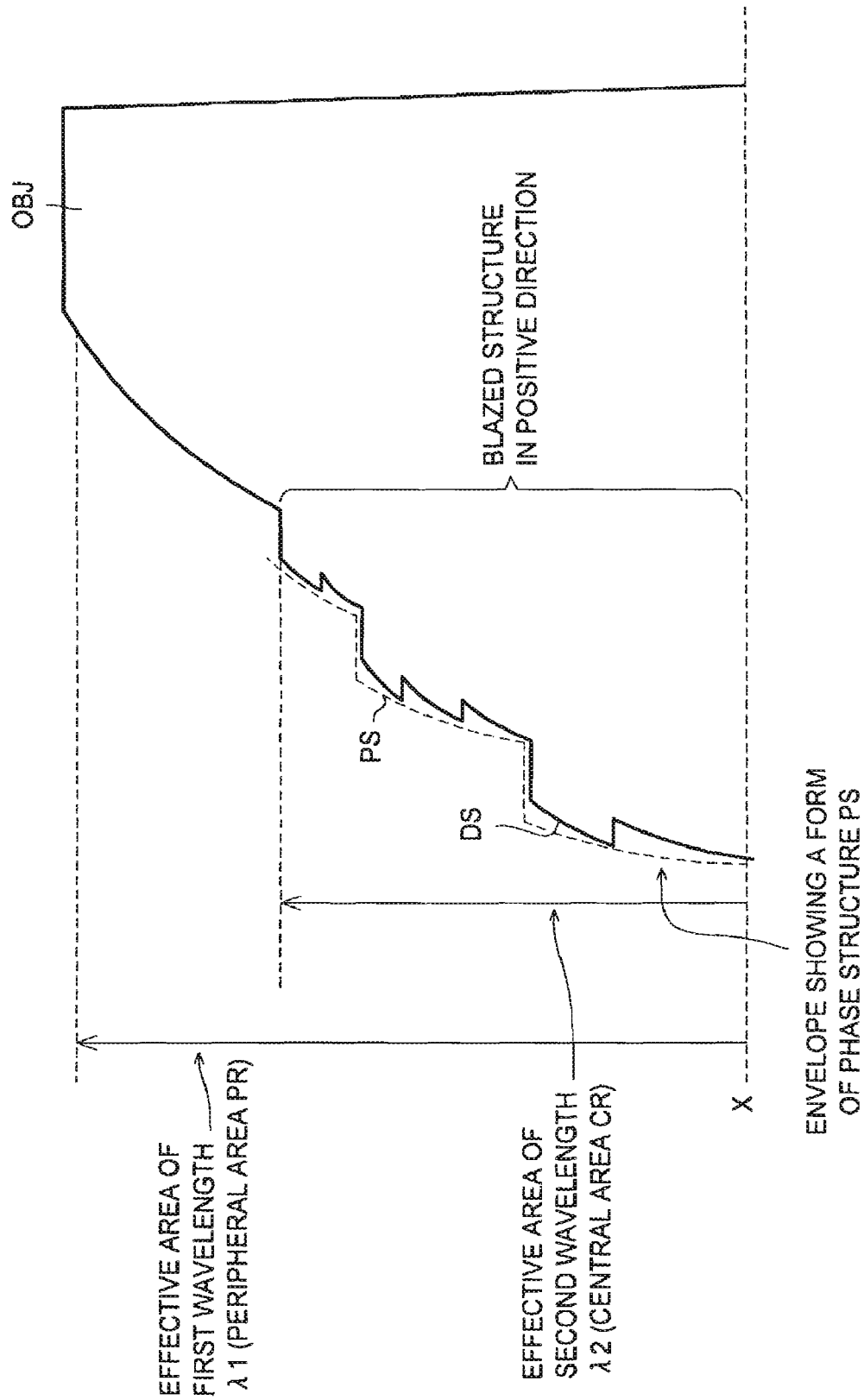
FIG. 4 is a cross-sectional view relating to an example of objective lens OBJ in which a diffractive structure and a phase structure are formed on an optical surface that faces a light source.

FIG. 4 is a cross-sectional view relating to an example of objective lens OBJ in which a diffractive structure and a phase structure are formed on an optical surface that faces a light source, and diffractive structure DS and phase structure PS are shown exaggeratively for easy understanding. The central area CR corresponds to a region such that each of the first light flux and the second light flux passing through the central area commonly is used for recording and/or reproducing of information on a corresponding optical information recording medium. The peripheral area PR corresponds to a region such that only the first light flux passing through the peripheral area is used for recording and/or reproducing of information on a corresponding optical information recording medium. In FIG. 4, the diffractive structure DS whose section having optical axis X shown with a solid line at the center is in a blaze is of the structure displaced partially in the axial direction, because the diffractive structure DS is superposed on the phase structure PS. In the example shown in FIG. 4, when a step difference in the phase structure PS along the optical axis or its extension and the peak of the blaze is connected with a line, an envelope curve (dotted lines shown in FIG. 4) showing a form of the phase structure PS is drawn. Incidentally, as the diffractive structure DS, a blaze structure in the negative direction may be intermingled.

According to the objective lens described in Structure 30, in the objective lens of Structure 29, the diffractive structure has a wavelength dependency of a spherical aberration such that a spherical aberration changes in an under-corrected direction when a wavelength of an incident light flux becomes long, and the phase structure has a wavelength dependency of a spherical aberration such that a spherical aberration changes in an over-corrected direction when a wavelength of an incident light flux becomes long.

According to the objective lens described in Structure 31, in the objective lens of Structure 29 or 30, one of ring-shaped zones of the phase structure comprises an integer number being equal to or more than one of ring-shaped zones of the diffractive structure. More specifically, the foregoing means situation where blazes of the diffractive structure DS in quantity of an integer of just one or more are formed in one step of the envelope curve showing the form of the phase structure PS in FIG. 4. Owing to this, a mold can be processed easily, and the diffractive structure and the phase structure can be generated accurately.

According to the objective lens described in Structure 32, in the objective lens of any one of Structures 29 to 31, the diffraction order is one and a blaze wavelength $\lambda B$ of the diffractive structure satisfies the following expression (1), therefore, it is possible to change properly a balance of diffraction efficiency between the first wavelength $\lambda 1$ and the second wavelength $\lambda 2$.

$$\lambda 1 < \lambda B < \lambda 2 \quad (1)$$

The objective lens described in Structure 33, in the objective lens of any one of Structures 29 to 31, satisfies the following expressions (2) and (3). Therefore, recording and/or reproducing of information can be conducted on a compatible basis for BD and CD or for HD and CD, for example.

$$380 \text{ nm} < \lambda 1 < 420 \text{ nm} \quad (2)$$

$$630 \text{ nm} < \lambda 2 < 680 \text{ nm} \quad (3)$$

The objective lens of the present invention is especially effective when the working wavelength satisfies expression (2) or expression (3), and its effect can be exhibited to a maximum extent.

According to the objective lens described in Structure 34, in the objective lens of Structure 33, when NA1 is a numerical aperture of the objective lens for recording or reproducing information on the first optical information recording medium and NA2 is a numerical aperture of the objective lens for recording or reproducing information on the second optical information recording medium, an area within the numerical aperture NA2 includes the superimposed structure, and a blaze wavelength $\lambda B$ of the diffractive structure, the numerical aperture NA1, and the numerical aperture NA2 satisfy following expressions (4) and (5).

$$1.15 \times \lambda 1 < \lambda B < 0.85 \times \lambda 2 \quad (4)$$

$$NA2/NA1 < 0.8 \quad (5)$$

Although it is preferable to split the diffraction efficiency to respective light fluxes by making the blaze wavelength $\lambda B$ of the diffractive structure to be an intermediate wavelength between the first wavelength $\lambda 1$ and the second wavelength $\lambda 2$, there is a possibility that high diffraction efficiency cannot be secured for any of wavelengths, because a wavelength difference between the first wavelength $\lambda 1$ and the second wavelength $\lambda 2$ is large.

When the numerical aperture NA2 of the objective lens is sufficiently small for numerical aperture NA1 (namely, when numerical aperture NA1 and numerical aperture NA2 satisfy expression (5)), the rate of area of the area (central area) where the diffractive structure is formed for the effective diameter with the first wavelength $\lambda 1$ becomes small, and thereby, it is possible to secure the sufficiently high area weighted average in effective diameter of the diffraction efficiency for the first wavelength $\lambda 1$, even in the case where diffraction efficiency of the second wavelength $\lambda 2$ is made to be closer to the second wavelength $\lambda 2$ (namely, in the case where blaze wavelength $\lambda B$ satisfies expression (4)).

If the blaze wavelength $\lambda B$ is greater than the lower limit of expression (4), the diffraction efficiency of the second wavelength $\lambda 2$ can be secured to be sufficiently high, whereby, recording and reproducing characteristics for the second optical information recording medium can be made to be excellent. On the other hand, if the blaze wavelength $\lambda B$ is smaller than the upper limit of expression (4), area weighted average in effective diameter of the diffraction efficiency for the first wavelength $\lambda 1$ can be made to be high sufficiently, whereby, recording and reproducing characteristics for the first optical information recording medium can be made to be excellent.

According to the objective lens described in Structure 35, in the objective lens of Structure 33 or 34, the same amount of optical path difference is substantially 5 times as longer as the first wavelength λ1 for the first light flux, and is substantially 3 times as longer as the second wavelength λ2 for the second light flux. Owing to this, the same amount of optical path difference can be added to the first wavelength λ1 and to the second wavelength λ2 which respectively satisfy expression (2) and expression (3). Herein, each of "5 times" and "3 times" described in the specification may be substantially 5 times or substantially 3 times from a optical design viewpoint, and does not naturally mean only an integer times value in strict mean. Each of "substantially 5 times" and "substantially 3 times" described in the specification means the same. "Substantially 5 times" means a range from 4.8 times to 5.2 times and "Substantially 3 times" means a range from 2.8 times to 3.2 times.

According to the objective lens described in Structure 36, in the objective lens of any one of Structures 29 to 35, the peripheral area is an aspheric surface where a microscopic step structure is not formed, and transmittance on the peripheral area where an inclination is step can be enhanced. Further, because of the structure wherein spherical aberration caused by a difference of recording/reproducing wavelengths for the first optical information recording medium and the second optical information recording medium and of protective layer thicknesses is corrected only in the central area, and spherical aberration of the second light flux passing through the peripheral area is not corrected, the second light flux that has passed through the peripheral area becomes flare component that does not contribute to spot forming on the information recording surface of the second optical information recording medium. Due to this, the aperture restriction corresponding to the numerical aperture of the second optical information recording medium can be conducted automatically. Incidentally, "microscopic step structure" mentioned here means a diffractive structure and a phase structure.

According to the objective lens described in Structure 37, in the objective lens of any one of Structures 29 to 36, the optical surface including the diffractive structure and the phase structure faces a light source side when the optical surface is provided in the optical pickup apparatus, thereby, its angle of divergence or a convergent angle is relatively small, even when a divergent light flux or a convergent light flux enters the objective lens, not to speak of the occasion where the parallel light flux enters the objective lens, whereby, a decline of transmittance caused by vignetting of a ray of light can be restrained.

According to the objective lens described in Structure 38, in the objective lens of any one of Structures 29 to 37, the diffractive structure comprises a blaze structure whose direction switches at least one time from a negative direction to a positive direction at a farther position from an optical axis. Meantime, in the present specification, it is assumed that a blaze structure wherein an optical path length becomes shorter as a position gets away from the optical axis is in the positive direction, while, a blaze structure wherein an optical path length becomes longer as a position gets away from the optical axis is in the negative direction.

Figure 5:
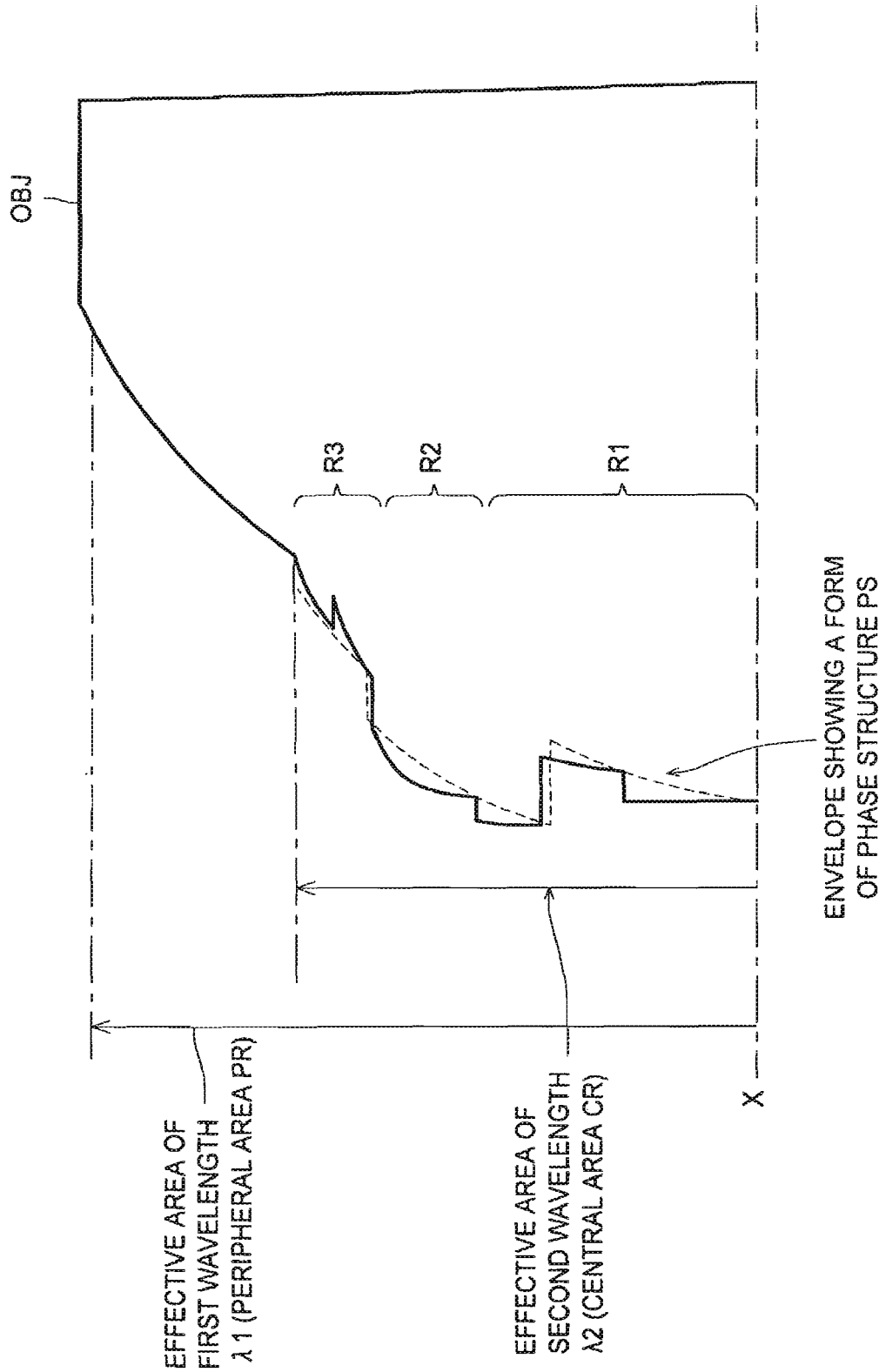
FIG. 5 is a cross-sectional view relating to another example of objective lens OBJ in which a diffractive structure and a phase structure are formed on an optical surface that faces a light source.

FIG. 5 is a cross-sectional view relating to another example of objective lens OBJ in which a diffractive structure and a phase structure are formed on an optical surface that faces a light source, in which a superficial form is shown exaggeratively for easy understanding. In the objective lens OBJ shown in FIG. 5, the central area CR is formed of the first area R1 including optical axis X, the second area R2 surrounding the first area and the third area R3 that surrounds the second area and is in contact with peripheral area PR. In the first area R1 in this case, when the step difference of the phase structure along the optical axis or its extension and the bottom portion of the ring-shaped groove is connected with a line, an envelope curve showing a form of phase structure PS (dotted lines in FIG. 5) is drawn because a blaze structure in the negative direction is superposed on the phase structure, while, in the third area R3, when the step difference of the phase structure along the optical axis or its extension and the peak point of the blaze is connected with a line, an envelope curve showing a form of phase structure PS (dotted lines in FIG. 5) is drawn because a blaze structure in the positive direction is superposed on the phase structure. The second area R2 is a transition region that is necessary for switching between the blaze structure in the negative direction and the blaze structure in the positive direction. This transition region is an area corresponding to the point of inflection of the optical path difference function when an optical path difference to be added to a transmission wave front by the diffractive structure is expressed by the optical path difference function stated later. If the optical path difference has the point of inflection, an inclination of the optical path difference function becomes small, thus, a pitch of ring-shaped zone of the blaze structure can be broadened, and a decline of transmittance caused by a form error of the diffractive structure can be restrained. Incidentally, when a direction of the blaze structure is switched once from the negative direction to the positive direction as a position gets away from the optical axis, it is preferable that a form of the phase structure is made to be a form that is displaced in the optical axis direction (dotted lines shown in FIG. 5) so that an optical path length grows greater as a position gets away from the optical axis until the prescribed height of the central area, and an optical path length becomes shorter as a position gets away from the optical axis in the outside of the prescribed height, as shown in FIG. 5. In this case, it is preferable that positions in the height of 70% of the central area are included in the ring-shaped zone having the longest optical path length among ring-shaped zones of the phase structure.

According to the objective lens described in Structure 39, in the objective lens of any one of Structures 29 to 37, the diffractive structure includes a blaze structure with a positive direction. The blaze structure in the positive direction is shown in FIG. 4. By making blaze structures to be in the same direction in the central area, it is possible to keep the position where a processing tool for a mold touches the mold to be constant in terms of position, which makes it possible to generate the blaze structure accurately. Further, by making the direction of the blaze structure to be positive, it is possible to correct chromatic aberration (focus position deviation caused by microscopic wavelength change), and stable information/recording characteristics for the first optical information recording medium employing a short wavelength laser light source can be obtained. Meantime, when a direction of the blaze structure is positive in the central area, it is preferable that a form of the phase structure is made to be a form to be displaced in the optical axis direction (dotted lines shown in FIG. 4) so that an optical path length may become shorter as a position gets away from the optical axis as shown in FIG. 4.

According to the objective lens described in Structure 40, in the objective lens of any one of Structures 29 to 39, the objective lens is a glass lens in which a change of refractive index caused by a temperature change can be restrained to be small. The objective lens of the invention can be applied to any of a resin lens and a glass lens, and the same effect can be obtained for both of them. However, a glass lens is preferable, because a change of refractive index of a resin lens caused by a temperature change is greater than that of a glass lens by an amount equivalent to 10 times the refractive index or more. Since spherical aberration grows greater in proportion to the fourth power of a numerical aperture of the objective lens, an influence of spherical aberration caused by a refractive index change becomes serious, when a resin lens serves as an objective lens in BD whose numerical aperture is 0.85. When a glass lens serves as an objective lens of the invention, it is possible to provide an objective lens having a broad range of working temperatures.

According to the objective lens described in Structure 41, in the objective lens of any one of Structures 29 to 39, the objective lens is formed by cementing a resin layer comprising the superimposed structure on a glass element, whereby, it is possible to restrain a change of refractive index caused by a temperature change to be small despite easy manufacturing.

Owing to the structure of the invention, it is possible to provide an objective lens having a broad range of working temperatures can be provided, and transferability for diffractive structure and phase structure can be improved. As a method for forming a resin layer, suitable for manufacturing is a method wherein a mold on which a diffractive structure and a phase structure are formed is pressed against UV curing resin coated on a glass lens, to be subjected to exposure to ultraviolet radiation.

According to the objective lens described in Structure 42, in the objective lens of any one of Structures 29 to 41, the objective lens satisfies the following expressions (6) and (7).

$$-0.02 < m1 < 0.02 \quad (6)$$

$$-0.02 < m2 < 0.02 \quad (7)$$

Where m1 is a magnification of the objective lens for recording or reproducing information on the first optical information recording medium, m2 is a magnification of the objective lens for recording or reproducing information on the second optical information recording medium.

Owing to the foregoing, a light flux with any wavelength can enter the objective lens under the state of a parallel light flux substantially, and thereby, occurrence of coma caused by tracking can be restrained, and excellent tracking characteristics can be obtained. Further, by making magnification m1 and magnification m2 to be the same magnification, an optical element arranged between the laser light source and the objective lens and a light-receiving element that receives a reflected light flux coming from the information recording surface can easily be made common, which results in an advantageous point for reduction of the number of parts of an optical pickup apparatus, lower cost and for space saving.

The optical pickup apparatus described in Structure 43 is an optical pickup apparatus including: a first light source for emitting a first light flux with a first wavelength $\lambda 1$; a second light source for emitting a second light flux with a second wavelength $\lambda 2$; a converging optical system comprising an objective lens; and a photodetector. The optical pickup apparatus reproduces and/or records information for a first optical information recording medium having a protective layer with a thickness t1 by using the first light flux with the first wavelength $\lambda 1$ emitted by the first light source. The optical pickup apparatus reproduces and/or records information for a second optical information recording medium having a protective layer with a thickness t2 (t1≦t2) by using the second light flux with the second wavelength $\lambda 2$ ($\lambda 1 < \lambda 2$) emitted by the second light source. The objective lens has a single lens structure, The objective lens includes: an optical surface comprising at least two regions including a central area including an optical axis; and a peripheral area surrounding the central area; the central area comprises a diffractive structure in which a diffraction order providing a maximum efficiency for each of the first light flux and the second light flux is a same each other, and a phase structure providing a same amount of optical path difference for each of the first light flux and the second light flux. Influences and effects of this invention are the same as those of the invention described in Structure 29.

According to the optical pickup apparatus described in Structure 44, in the optical pickup apparatus of Structure 43, the diffractive structure of the objective lens has a wavelength dependency of a spherical aberration such that a spherical aberration changes in an under-corrected direction when a wavelength of an incident light flux becomes long and the phase structure has a wavelength dependency of a spherical aberration such that a spherical aberration changes in an over-corrected direction when a wavelength of an incident light flux becomes long. Influences and effects of this invention are the same as those of the invention described in Structure 30.

According to the optical pickup apparatus described in Structure 45, in the optical pickup apparatus of Structure 43 or 44, one of ring-shaped zones of the phase structure comprises an integer number being equal to or more than one of ring-shaped zones of the diffractive structure. Influences and effects of this invention are the same as those of the invention described in Structure 31.

According to the optical pickup apparatus described in Structure 46, in the optical pickup apparatus of any one of Structures 43 to 45, the diffraction order is one and a blaze wavelength $\lambda B$ of the diffractive structure satisfies the following expression (1).

$$\lambda 1 < \lambda B < \lambda 2 \quad (1)$$

Influences and effects of this invention are the same as those of the invention described in Structure 32.

The optical pickup apparatus described in Structure 47, in the optical pickup apparatus of any one of Structures 43 to 46, satisfies the following expressions (2) and (3).

$$380 \text{ nm} < 1 < 420 \text{ nm} \quad (2)$$

$$630 \text{ nm} < \lambda 2 < 680 \text{ nm} \quad (3)$$

Influences and effects of this invention are the same as those of the invention described in Structure 33.

According to the optical pickup apparatus described in Structure 48, in the optical pickup apparatus of Structure 47, when NA1 is a numerical aperture of the objective lens for recording or reproducing information on the first optical information recording medium and NA2 is a numerical aperture of the objective lens for recording or reproducing information on the second optical information recording medium, an area within the numerical aperture NA2 includes the superimposed structure, a blaze wavelength $\lambda B$ of the diffractive structure, the numerical aperture NA1, and the numerical aperture NA2 satisfy the following expressions (4) and (5).

$$1.15 \times \lambda 1 < \lambda B < 0.85 \times \lambda 2 \quad (4)$$

$$NA2/NA1 < 0.8 \quad (5)$$

Influences and effects of this invention are the same as those of the invention described in Structure 34.

According to the optical pickup apparatus described in Structure 49, in the optical pickup apparatus of Structures 47 or 48, the same amount of optical path difference is substantially 5 times as longer as the first wavelength $\lambda 1$ for the first light flux, and is substantially 3 times as longer as the second wavelength $\lambda 2$ for the second light flux. Influences and effects of this invention are the same as those of the invention described in Structure 35.

According to the optical pickup apparatus described in Structure 50, in the optical pickup apparatus of any one of Structures 43 to 49, the peripheral area is an aspheric surface where a microscopic step structure is not formed. Influences and effects of this invention are the same as those of the invention described in Structure 36.

According to the optical pickup apparatus described in Structure 51, in the optical pickup apparatus of Structures 43 to 50, the optical surface including the diffractive structure and the phase structure faces a light source side when the optical surface is provided in the optical pickup apparatus. Influences and effects of this invention are the same as those of the invention described in Structure 37.

According to the optical pickup apparatus described in Structure 52, in the optical pickup apparatus of any one of Structures 43 to 51, the diffractive structure comprises a blaze structure whose direction switches at least one time from a negative direction to a positive direction at a farther position from an optical axis. Influences and effects of this invention are the same as those of the invention described in Structure 38.

According to the optical pickup apparatus described in Structure 53, in the optical pickup apparatus of any one of Structures 43 to 51, the diffractive structure comprises a blaze structure with a positive direction. Influences and effects of this invention are the same as those of the invention described in Structure 39.

According to the optical pickup apparatus described in Structure 54, in the optical pickup apparatus of any one of Structures 43 to 53, the objective lens is a glass lens. Influences and effects of this invention are the same as those of the invention described in Structure 40.

According to the optical pickup apparatus described in Structure 55 in the optical pickup apparatus of any one of Structures 43 to 53, the objective lens is formed by cementing a resin layer comprising the superimposed structure on a glass element. Influences and effects of this invention are the same as those of the invention described in Structure 41.

According to the optical pickup apparatus described in Structure 56, in the optical pickup apparatus of any one of Structures 43 to 55, the objective lens satisfies the following expressions (6) and (7).

$$-0.02 < m1 < 0.02 \quad (6)$$

$$-0.02 < m2 < 0.02 \quad (7)$$

Where m1 is a magnification of the objective lens for recording or reproducing information on the first optical information recording medium, m2 is a magnification of the objective lens for recording or reproducing information on the second optical information recording medium. Influences and effects of this invention are the same as those of the invention described in Structure 42.

The optical pickup apparatus described in Structure 57, is the optical pickup apparatus including: a light source; the objective lens of any one of Structures 1 to 28; and a photo-detector.

The optical information recording and/or reproducing apparatus described in Structure 58 is an optical information recording and/or reproducing apparatus comprising the optical pickup apparatus of any one of Structures 43 to 57.

In the present specification, "an objective lens" is an optical system that is arranged at a position to face an optical information recording medium in an optical pickup apparatus and has a function to converge a light flux emitted from the light source on an information recording surface of an optical information recording media (which are also called optical discs), and means an optical system being capable to displace by an actuator at least in the optical axis direction when mounted in an optical pickup apparatus. "An objective lens" can be a single lens, can be formed of a plurality of lenses, or can include another optical element.

When a glass lens serves as an objective lens, if a glass material whose glass transition point Tg is 400° C. or less is used, a life of the mold is extended because molding at a relatively low temperature can be carried out. As a glass material having such low glass transition point Tg, K-PG325 and K-PG375 (both are product names) made by Sumita Optical Glass Co., for example, are available.

Meanwhile, since specific gravity of a glass lens is generally greater than that of a resin lens, and if an objective lens is a glass lens, weight thereof is increased and a load on an actuator that drives an objective lens is increased. Therefore, it is preferable to use a glass material whose specific gravity is small, when a glass lens serves as an objective lens. Specifically, a glass material whose specific gravity is 3.0 or less is preferable, and more preferable is 2.8 or less.

When a resin lens serves as an objective lens, it is preferable to use cyclic-olefin-based resin materials, and it is more preferable to use resin materials wherein refractive index at 25° C. for wavelength 405 nm is within a range of 1.54-1.60 and refractive index change rate dN/dT (° C.$^{-1}$) for wavelength 405 nm caused by temperature change within a temperature range from −5° C. to 70° C. is within a range of $-10 \times 10^{-5}$ to $-8 \times 10^{-5}$, among cyclic-olefin-based resin materials.

Or, as a resin material suitable for the objective lens of the invention, "athermal resin" is available in addition to the cyclic-olefin-based resin materials. The athermal resin is a resin material having therein a dispersed particle with a diameter of 30 nm or less having refractive index change rate whose sign is opposite to that of the refractive index change rate caused by temperature change of resin serving as a base material. In general, when fine particles are mixed with a transparent resin material, scattering of light is generated and transmittance is lowered, which has made it difficult to use as an optical material. However, it has become clear that actual occurrence of scattering can be prevented by making a size of the fine particle to be smaller than a wavelength of a transmitted light flux.

Incidentally, when a temperature rises, a refractive index of a resin material is lowered, but a refractive index of an inorganic particle is enhanced when a temperature rises. Thus, there is known a method to prevent a change of refractive index, by utilizing the aforesaid properties so that they cancel each other. By using a material wherein an inorganic particle that measures 30 nanometers or less, preferably 20 nanometers or less, more preferably 10-15 nanometers is dispersed in resin representing a base material, as a material of the objective lens of the invention, it is possible to provide an objective lens having no temperature-dependency for refractive index, or having extremely low temperature-dependency.

For example, a fine particle of niobium oxide ($Nb_2O_5$) is dispersed in acrylic resin. Resin representing a base material in 80 percent by volume and niobium oxide in 20 percent by volume are mixed evenly. Though a fine particle has a problem to cohere easily, necessary state of dispersion can be obtained through a technology to disperse by giving electric charges to the surface of a particle.

As will be stated later, it is preferable to conduct mixing and dispersion for the resin representing a base material and particles through in-line in the course of injection molding of the objective lens. In other words, it is preferable that neither cooling nor solidification is given after mixing and dispersion, until an objective lens is molded.

Incidentally, this percent by volume can be increased or decreased properly for controlling a rate of changes of refractive index for the temperature, and it is also possible to blend plural types of inorganic particles in a nanometer-size to be dispersed.

With respect to the percent, though it is 80:20, namely 4:1 in the example above, it can be adjusted properly within a range of 90:10 (9:1) to 60:40 (6:4). If the percent is less than 9:1, an effect of temperature change control is lowered, and if it exceeds 3:2 on the contrary, a problem is caused on moldability of resin, which is not preferable.

It is preferable that fine particles are inorganic materials, and it is more preferable that they are oxides. Preferable is an oxide which is in saturated state of oxidation and is not oxidized any more.

When a fine particle is an inorganic material, its reaction with resin that is to be a base material representing a high molecular organic compound can be restrained to be low, and when it is an oxide, it is possible to prevent deterioration in the course of usage. Under the severe conditions such as high temperatures and irradiation of a laser beam, in particular, the fine particle tends to be oxidized. However, deterioration by oxidation can be prevented when the fine particle is inorganic oxide.

For preventing oxidation of resin caused by other factors, it is naturally possible to add antioxidant.

Incidentally, as resin representing a base material, those described in TOKUKAI Nos. 2004-144951, 2004-144954 and 2004-144953 can be used properly and preferably.

Herein, although the above description describes using an example of the lens in which an superimposed structure superimposed a diffractive structure and a phase structure on an optical surface of the lens, the superimposed structure may be formed by being superimposed with optical path difference structures each having similar function. When the superimposed structure is provided by being superimposed at least two different optical path difference providing structures on one surface having a power of the lens, such as a first optical path difference structure whose spherical aberration changes in under-corrected direction when a wavelength of an incident light flux becomes longer, and a second optical path difference structure whose spherical aberration changes in over-corrected direction when a wavelength of an incident light flux becomes longer, more concretely, it allows the objective lens whose a spherical aberration has a small wavelength-dependency.

In the present invention, it is possible to provide an objective lens that can conduct recording and/or reproducing of information properly for various types of optical information recording media by using light fluxes with different wavelengths, and has small wavelength-dependency for spherical aberration, an optical pickup apparatus employing the aforesaid objective lens and an optical information recording and/or reproducing apparatus in which the aforesaid optical pickup apparatus is installed. It is also possible to an objective lens of a single lens structure that can conduct recording and/or reproducing of information properly for various types of optical information recording media, and has small wavelength-dependency for spherical aberration and has high transmittance, an optical pickup apparatus employing the aforesaid objective lens and an optical information recording and/or reproducing apparatus in which the aforesaid optical pickup apparatus is installed.

Figure 6:
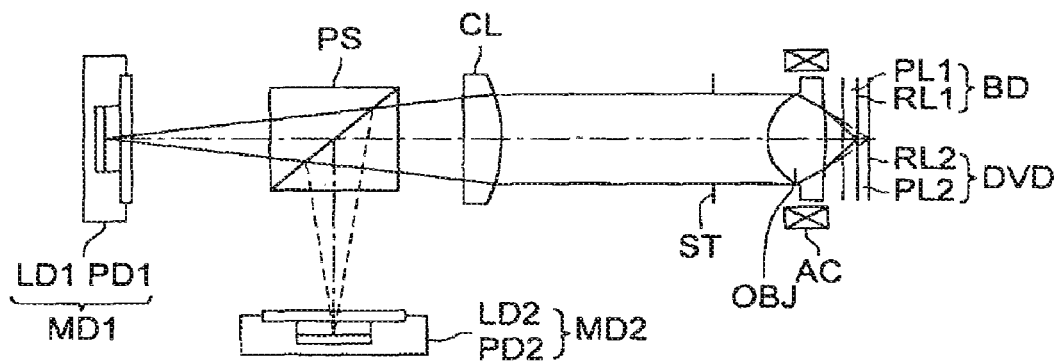
FIG. 6 is a diagram showing schematically the structure of an optical pickup apparatus in the present embodiment.

Embodiment of the invention will be explained as follows, referring to the drawings. FIG. 6 is a diagram showing schematically the structure of optical pickup apparatus PU1 in the present embodiment capable of conducting recording and/or reproducing of information properly for BD and DVD which are different types of optical information recording media (which is also called optical discs). The optical pickup apparatus PU1 of this kind can be provided in an optical information recording and/or reproducing apparatus. In this case, it is assumed that BD represents the first optical information recording medium and DVD represents the second optical information recording medium.

The optical pickup apparatus PU1 is schematically composed of first module MD1 in which violet semiconductor laser LD1 representing the first light source emitting the first light flux with first wavelength 408 nm and first photodetector PD1 that receives a reflected light flux coming from information recording surface RL1 of BD are united solidly, second module MD2 in which red semiconductor laser LD2 representing the second light source emitting the second light flux with second wavelength 658 nm and second photodetector PD2 that receives a reflected light flux coming from information recording surface RL2 of second optical disc OD2 are united solidly, dichroic prism PS, collimator lens CL, diaphragm ST, objective lens OBJ, and of biaxial actuator AC for focusing and tracking. Incidentally, an optical surface of the objective lens OBJ facing a light source is divided into a central area including an optical axis and a peripheral area that surrounds the central area, and a diffractive structure and a phase structure are formed on the central area.

A divergent light flux with first wavelength 408 nm emitted form the violet semiconductor laser LD1 is transmitted through dichroic prism PS and is transformed into a parallel light flux by collimator lens CL. After that, it is converted into circularly polarized light from linearly polarized light by an unillustrated quarter wavelength plate, and is regulated in terms of a light flux diameter by diaphragm ST to become a spot formed by objective lens OBJ on information recording surface RL1 of BD through 0.0875 mm-thick protective layer PL1.

A reflected light flux modulated by information pits on the information recording surface RL1 is transmitted again through objective lens OBJ and diaphragm ST, and then, is converted into a linearly polarized light from a circularly polarized light by an unillustrated quarter wavelength plate. Then, it is transformed into a converged light flux by collimator lens CL and is transmitted through dichroic prism PS to be converged on a light-receiving surface of the first photodetector PD1. Then, by conducting focusing and tracking on objective lens OBJ with biaxial actuator AC by the use of output signals coming from the first photodetector PD1, information recorded on BD can be read.

A divergent light flux with second wavelength 658 nm emitted from the red semiconductor laser LD2 is reflected by polarization dichroic prism PS, and then, is transformed into a parallel light flux by collimator lens CL. After that, the parallel light flux is converted into a circularly polarized light from a linearly polarized light by an unillustrated quarter wavelength plate, to enter the objective lens OBJ. A light flux with second wavelength 658 nm that has passed through the central area of the objective lens OBJ becomes a spot formed on information recording surface RL2 through 0.6 mm-thick protective layer PL2.

A reflected light flux modulated by information pits on the information recording surface RL1 is transmitted again through objective lens OBJ and diaphragm ST, and then, is converted into a linearly polarized light from a circularly polarized light by an unillustrated quarter wavelength plate. Then, it is transformed into a converged light flux by collimator lens CL and is transmitted through dichroic prism PS to be converged on a light-receiving surface of the first photodetector PD1. Then, by conducting focusing and tracking on objective lens OBJ with biaxial actuator AC by the use of output signals coming from the first photodetector PD1, information recorded on BD can be read.

Meanwhile, since a peripheral area of the objective lens OBJ is an aspheric surface where no microscopic step structure is formed, a light flux with second wavelength 658 nm which has passed through the peripheral area becomes a flare component that does not contribute to spot formation on information recording surface RL of DVD. Due to this, aperture restriction corresponding to a numerical aperture of DVD is conducted automatically.

EXAMPLES

An example suitable for the present embodiment will be explained below. From now on (including lens data in Tables), an exponent of 10 (for example, $2.5 \times 10^{-3}$) is assumed to be expressed by the use of E (for example, 2.5 E-3). In tables of the examples, the range h means a distance from the optical axis and its unit is mm, and unit of the curvature radiuses (R and Ri) is mm.

An optical surface of the objective optical system is formed to be an aspheric surface which is regulated by a numerical expression in which a coefficient shown in Table is substituted in each expression (8) and is on axial symmetry about an optical axis.

$$z=(h^2/R)/[1+\sqrt{1-(K+1)(h/R)^2}]+A_o+A_4h^4+A_6h^6+A_8h^8+A_{10}h^{10}+A_{12}h^{12}+A_{14}h^{14}+A_{16}h^{16}+A_{18}h^{18}+A_{20}h^{20} \quad (8)$$

In the expression above, z represents an aspheric surface form (distance in the direction parallel with an optical axis from a plane that is tangent to a peak of aspheric surface), h represents a distance from an optical axis, R represents a radius of curvature, K represents a conic constant, $A_o$, represents offset quantities $A_4, A_6, A_8, A_{10}, A_{12}, A_{14}, A_{16}, A_{18}$, and $A_{20}$ represents an aspheric surface coefficient.

Further, an optical path difference given by a diffractive structure to a light flux with each wavelength is regulated by a numerical expression wherein a coefficient shown in Table is substituted in an optical path difference function in expression (9).

$$\phi = dor \times \lambda/\lambda_B \times (C_2h^2 + C_4h^4 + C_6h^6 + C_8h^8 + C_{10}h^{10} + C_{12}h^{12} + C_{14}h^{14} + C_{16}h^{16} + C_{18}h^{18} + C_{20}h^{20}) \quad (9)$$

In the expression above, $\phi$ represents an optical path difference function, $\lambda$ represents a wavelength of a light flux entering a diffractive structure, $\lambda_B$ represents a blaze wavelength, dor represents diffraction order of diffracted light used for recording and/or reproducing for optical disc, h represents a distance from an optical axis $C_2, C_4, C_6, C_8, C_{10}, C_{12}, C_{14}, C_{16}, C_{18}$, and $C_{20}$ represents a diffraction surface coefficient.

Example 1

Tables 1-1 to 1-3 show lens data of Example 1 (including design wavelength, focal length, image side numerical aperture and magnification). Example 1 is represented by an objective lens made of glass (S-BSM14 made by OHARA Co., LTD.) suitable for an optical pickup apparatus shown in FIG. 6. An optical surface facing the light source is composed of 6 areas, in the order where the area shortest from the optical axis comes first, including $(2-1)^{th}$ surface including an optical axis, and other surfaces surrounding the aforesaid surface including $(2-2)^{th}$ surface, $(2-3)^{th}$ surface, $(2-4)^{th}$ surface, $(2-5)^{th}$ surface, and $(2-6)^{th}$ surface. An area including the areas $(2-1)^{th}$ to $(2-5)^{th}$ corresponds to the central area and the $(2-6)^{th}$ area corresponds to a peripheral area. On each of the areas $(2-1)^{th}$ to $(2-5)^{th}$, there is formed a diffractive structure of blaze wavelength λB: 490 nm, and its diffraction order is first order for BD and first order for DVD, while, diffraction efficiency is 85% for BD and 79% for DVD. The $(2-6)^{th}$ area is of the aspheric surface form.

TABLE 1-1

| (Example 1) | | |
|---|---|---|
| Design wavelength | λ1: 408 nm | λ2: 658 nm |
| Focal length | f1: 1.756 mm | f2: 1.829 mm |
| Image side numerical aperture | NA1: 0.85 | NA2: 0.66 |
| Magnification | m1: 0 | m2: 0 |
| Effective diameter of $2^{nd}$ surface | φ3.00 mm | φ2.36 mm |

| (Paraxial data) | | | | | | | |
|---|---|---|---|---|---|---|---|
| *1 | Ri | di (408 nm) | ni (408 nm) | di (658 nm) | ni (658 nm) | nd | vd | *2 |
| 0 | ∞ | | | ∞ | | | | *3 |
| 1 | | 0 | | 0 | | | | *4 |
| 2 | *7 | 2.040 | 1.619312 | 2.040 | 1.600017 | 1.603110 | 60.70 | *5 |
| 3 | −3.481067 | 0.585 | | 0.330 | | | | |
| 4 | ∞ | 0.0875 | 1.618381 | 0.6 | 1.577286 | 1.583000 | 29.90 | *6 |
| 5 | ∞ | | | | | | | |

*1: $i^{th}$ surface,
*2: Remarks,
*3: Light emitting point,
*4: Diaphragm (aperture diameter: 3.00 mm),
*5: Objective lens,
*6: Protective layer,
*7: Refer to the below

TABLE 1-2

(The 2$^{nd}$ surface data)

| | | Surface No. | | |
|---|---|---|---|---|
| | | 2-1 | 2-2 | 2-3 |
| Range | | h ≦ 0.35008 | 0.35008 ≦ h ≦ 0.59068 | 0.59068 ≦ h ≦ 1.05766 |
| Curvature radius | R | 1.194045E+00 | 1.195396E+00 | 1.195441E+00 |
| Conic constant, | K | −7.382364E−01 | −7.459708E−01 | −7.299149E−01 |
| Offset quantities of aspheric surface, Aspheric surface coefficient | A0 | 0.000000E+00 | −3.268199E−03 | −6.623439E−03 |
| | A4 | 1.665587E−02 | 1.751344E−02 | 1.566717E−02 |
| | A6 | −9.148056E−04 | −9.148056E−04 | −9.148056E−04 |
| | A8 | 9.438837E−03 | 9.438837E−03 | 9.438837E−03 |
| | A10 | −9.426938E−03 | −9.426938E−03 | −9.426938E−03 |
| | A12 | 3.241226E−03 | 3.241226E−03 | 3.241226E−03 |
| | A14 | 3.367303E−03 | 3.367303E−03 | 3.367303E−03 |
| | A16 | −4.237271E−03 | −4.237271E−03 | −4.237271E−03 |
| | A18 | 1.772613E−03 | 1.772613E−03 | 1.772613E−03 |
| | A20 | −2.704472E−04 | −2.704472E−04 | −2.704472E−04 |
| Blaze wavelength λB | | 490 nm | 490 nm | 490 nm |
| Diffraction order dor | | 1 | 1 | 1 |
| Diffractive surface coefficients | C2 | 8.482943E−03 | 8.482943E−03 | 8.482943E−03 |
| | C4 | −3.854595E−03 | −3.854595E−03 | −3.854595E−03 |
| | C6 | −9.307274E−04 | −9.307274E−04 | −9.307274E−04 |
| | C8 | 2.558504E−05 | 2.558504E−05 | 2.558504E−05 |
| | C10 | −2.643697E−04 | −2.643697E−04 | −2.643697E−04 |

| | | Surface No. | | |
|---|---|---|---|---|
| | | 2-4 | 2-5 | 2-6 |
| Range | | 1.05766 ≦ h ≦ 1.12107 | 1.12107 ≦ h ≦ 1.18165 | 1.18165 ≦ h |
| Curvature radius | R | 1.194889E+00 | 1.193002E+00 | 1.224146E+00 |
| Conic constant, | K | −7.340523E−01 | −7.346946E−01 | −6.507430E−01 |
| Offset quantities of aspheric surface, Aspheric surface coefficient | A0 | −3.273695E−03 | −2.185958E−04 | −1.090000E−03 |
| | A4 | 1.631471E−02 | 1.638545E−02 | 1.645713E−02 |
| | A6 | −9.148056E−04 | −9.148056E−04 | −1.751127E−03 |
| | A8 | 9.438837E−03 | 9.438837E−03 | 1.084951E−02 |
| | A10 | −9.426938E−03 | −9.426938E−03 | −9.517458E−03 |
| | A12 | 3.241226E−03 | 3.241226E−03 | 2.721279E−03 |
| | A14 | 3.367303E−03 | 3.367303E−03 | 3.909766E−03 |
| | A16 | −4.237271E−03 | −4.237271E−03 | −4.343915E−03 |
| | A18 | 1.772613E−03 | 1.772613E−03 | 1.772037E−03 |
| | A20 | −2.704472E−04 | −2.704472E−04 | −2.721958E−04 |
| Blaze wavelength λB | | 490 nm | 490 nm | |
| Diffraction order dor | | 1 | 1 | |
| Diffractive surface coefficients | C2 | 8.482943E−03 | 8.482943E−03 | |
| | C4 | −3.854595E−03 | −3.854595E−03 | |
| | C6 | −9.307274E−04 | −9.307274E−04 | |
| | C8 | 2.558504E−05 | 2.558504E−05 | |
| | C10 | −2.643697E−04 | −2.643697E−04 | |

TABLE 1-3

(3$^{rd}$ surface data)

| | | Surface No. 3 |
|---|---|---|
| Conic constant, | K | −1.114392E+02 |
| Offset quantities of aspheric surface, Aspheric surface coefficient | A0 | 0.000000E+00 |
| | A4 | 1.719358E−01 |
| | A6 | −3.065366E−01 |
| | A8 | 3.948622E−01 |
| | A10 | −3.474668E−01 |
| | A12 | 1.683475E−01 |
| | A14 | −3.382024E−02 |
| | A16 | 0.000000E+00 |
| | A18 | 0.000000E+00 |
| | A20 | 0.000000E+00 |

Phase structures are superposed on areas (2-1)$^{th}$ to (2-5)$^{th}$, and a light flux with λ1 which has passed through the (2-1)$^{th}$ area is given an optical path difference of 5×λ1 (nm) in the (2-2)$^{th}$ area, whereby, the phase of the light flux is delayed by 2π×5 (rad) in conversion to phase difference. In addition, since optical path differences of 10×λ1 (nm), 5×λ1 (nm) and 0×λ1 (nm) are given to the light flux with wavelength λ1 transmitted through the (2-1)$^{th}$ surface, on the (2-3)$^{th}$ surface, (2-4) surface and (2-5)$^{th}$ surface, the phase of the light flux is delayed respectively by 2π×10 (rad), 2π×5 (rad) and 2π×0 (rad), in conversion to phase difference. Further, since optical path differences of 3×λ2 (nm), 6×λ2 (nm), 3×λ2 (nm) and 0×λ2 (nm) are given to the light flux with wavelength λ2 transmitted through the (2-1)$^{th}$ surface, on the (2-2)$^{th}$ surface, (2-3)$^{th}$ surface, (2-4)$^{th}$ surface and (2-5)$^{th}$ surface, the phase of the light flux is delayed respectively by 2π×3 (rad), 2π×6 (rad), 2π×3 (rad) and 2π×0 (rad), in conversion to phase difference. Namely, an optical path difference added by one step of the diffractive structure to a light flux with each wavelength is 2040 nm for the first wavelength λ1, and 1974 nm for the second wavelength λ2, which means that an optical path difference in substantially the same amount is given to the light flux with any wavelength. Incidentally, in the present example, the direction of the blaze structure is changed once from the negative direction to the positive direction as its position gets away from the optical axis (see FIG. 5).

On the other hand, an optical surface facing an optical disc (3$^{rd}$ surface) is in a form of an aspheric surface. In the objective lens of this kind in Example 1, an amount of change of spherical aberration in the case where the first wavelength $\lambda 1$ is changed by +5 nm, is 0.029 $\lambda$1RMS for $3^{rd}$ order component and is 0.010 $\lambda$1RMS for higher order component, which means that the higher order component is declined, for the amount of change in the case where an phase structure is not superposed on a diffractive structure on the second surface (0.009 $\lambda$1RMS for $3^{rd}$ order component and 0.029 $\lambda$RMS for higher order component). Incidentally, in this case, "higher order component" is made to be a square root of sum of squares for 5 order components and $7^{th}$ order components.

Example 2

Example 2 is represented by an objective lens made of resin suitable for an optical pickup apparatus shown in FIG. 6.

Tables 2-1 to 2-3 show lens data of Example 2 (including design wavelength, focal length, image side numerical aperture and magnification). An optical surface facing the light source is composed of 6 areas, in the order where the area closest to the optical axis comes first, including $(2-1)^{th}$ surface including an optical axis, and other surfaces surrounding the $(2-1)^{th}$ surface including $(2-2)^{th}$ surface, $(2-3)^{th}$ surface, $(2-4)^{th}$ surface, $(2-5)^{th}$ surface, and $(2-6)^{th}$ surface. An area including the $(2-1)^{th}$ to $(2-5)^{th}$ areas corresponds to the central area and the $(2-6)^{th}$ area corresponds to a peripheral area. On each of the $(2-1)^{th}$ to $-5)^{th}$ areas, there is formed a diffractive structure of blaze wavelength $\lambda$B: 490 nm, and its diffraction order is first order for BD and first order one for DVD, while, its diffraction efficiency is 85% for BD and 78% for DVD. The $(2-6)^{th}$ area is of the aspheric surface form.

TABLE 2-1

(Example 2)

| | | | |
|---|---|---|---|
| Design wavelength | | $\lambda 1$: 408 nm | $\lambda 2$: 658 nm |
| Focal length | | f1: 1.750 mm | f2: 1.819 mm |
| Image side numerical aperture | | NA1: 0.85 | NA2: 0.66 |
| Magnification | | m1: 0 | m2: 0 |
| Effective diameter of $2^{nd}$ surface | | φ3.00 mm | φ2.36 mm |

(Paraxial data)

| *1 | Ri | di (408 nm) | ni (408 nm) | di (658 nm) | ni (658 nm) | nd | vd | *2 |
|---|---|---|---|---|---|---|---|---|
| 0 | | ∞ | | ∞ | | | | *3 |
| 1 | | 0 | | 0 | | | | *4 |
| 2 | *7 | 2.090 | 1.555891 | 2.090 | 1.537016 | 1.540000 | 56.00 | *5 |
| 3 | −2.103835 | 0.575 | | 0.323 | | | | |
| 4 | ∞ | 0.0875 | 1.618381 | 0.6 | 1.577286 | 1.583000 | 29.90 | *6 |
| 5 | ∞ | | | | | | | |

*1: $i^{th}$ surface,
*2: Remarks,
*3: Light emitting point,
*4: Diaphragm (aperture diameter: 3.00 mm),
*5: Objective lens,
*6: Protective layer,
*7: Refer to the below

TABLE 2-2

(The $2^{nd}$ surface data)

| | | Surface No. | | |
|---|---|---|---|---|
| | | 2-1 | 2-2 | 2-3 |
| Range | | h ≦ 0.35091 | 0.35091 ≦ h ≦ 0.59458 | 0.59458 ≦ h ≦ 0.96819 |
| Curvature radius | R | 1.133668E+00 | 1.135233E+00 | 1.136226E+00 |
| Conic constant, | K | −6.850841E−01 | −6.780327E−01 | −6.800790E−01 |
| Offset quantities of aspheric surface, | A0 | 0.000000E+00 | −3.639024E−03 | −7.302637E−03 |
| | A4 | 1.331718E−02 | 1.331718E−02 | 1.331718E−02 |
| | A6 | −5.450841E−03 | −5.450841E−03 | −5.450841E−03 |
| | A8 | 1.360654E−02 | 1.360654E−02 | 1.360654E−02 |
| | A10 | −1.127477E−02 | −1.127477E−02 | −1.127477E−02 |
| Aspheric surface coefficient | A12 | 2.264783E−03 | 2.264783E−03 | 2.264783E−03 |
| | A14 | 4.752927E−03 | 4.752927E−03 | 4.752927E−03 |
| | A16 | −4.837970E−03 | −4.837970E−03 | −4.837970E−03 |
| | A18 | 1.944066E−03 | 1.944066E−03 | 1.944066E−03 |
| | A20 | −3.092633E−04 | −3.092633E−04 | −3.092633E−04 |
| Blaze wavelength $\lambda$B | | 490 nm | 490 nm | 490 nm |
| Diffraction order dor | | 1 | 1 | 1 |
| Diffractive surface coefficients | C2 | 8.451792E−03 | 8.451792E−03 | 8.451792E−03 |
| | C4 | −3.836217E−03 | −3.836217E−03 | −3.836217E−03 |
| | C6 | −1.429704E−03 | −1.429704E−03 | −1.429704E−03 |
| | C8 | 4.406500E−04 | 4.406500E−04 | 4.406500E−04 |
| | C10 | −3.928447E−04 | −3.928447E−04 | −3.928447E−04 |

TABLE 2-2-continued (The 2$^{nd}$ surface data)

| | | Surface No. | | |
|---|---|---|---|---|
| | | 2-4 | 2-5 | 2-6 |
| Range | | 0.96819 ≦ h ≦ 1.10236 | 1.10236 ≦ h ≦ 1.18228 | 1.18228 ≦ h |
| Curvature radius | R | 1.134831E+00 | 1.132504E+00 | 1.164183E+00 |
| Conic constant, | K | −6.780902E−01 | −6.763422E−01 | −6.496444E−01 |
| Offset quantities of aspheric surface, Aspheric surface coefficient | A0 | −3.645168E−03 | −2.047064E−04 | −1.300000E−03 |
| | A4 | 1.309223E−02 | 1.265964E−02 | 1.797325E−02 |
| | A6 | −5.450841E−03 | −5.450841E−03 | −4.610060E−03 |
| | A8 | 1.360654E−02 | 1.360654E−02 | 1.372679E−02 |
| | A10 | −1.127477E−02 | −1.127477E−02 | −1.041468E−02 |
| | A12 | 2.264783E−03 | 2.264783E−03 | 2.715445E−03 |
| | A14 | 4.752927E−03 | 4.752927E−03 | 4.035671E−03 |
| | A16 | −4.837970E−03 | −4.837970E−03 | −4.561405E−03 |
| | A18 | 1.944066E−03 | 1.944066E−03 | 1.941560E−03 |
| | A20 | −3.092633E−04 | −3.092633E−04 | −3.084153E−04 |
| Blaze wavelength λB | | 490 nm | 490 nm | |
| Diffraction order dor | | 1 | 1 | |
| Diffractive surface coefficients | C2 | 8.451792E−03 | 8.451792E−03 | |
| | C4 | −3.836217E−03 | −3.836217E−03 | |
| | C6 | −1.429704E−03 | −1.429704E−03 | |
| | C8 | 4.406500E−04 | 4.406500E−04 | |
| | C10 | −3.928447E−04 | −3.928447E−04 | |

TABLE 2-3

(3$^{rd}$ surface data)

| | | Surface No. 3 |
|---|---|---|
| Conic constant | K | −4.479276E+01 |
| Aspheric surface coefficient | A0 | 0.000000E+00 |
| | A4 | 1.666797E−01 |
| | A6 | −2.901196E−01 |
| | A8 | 3.765674E−01 |
| | A10 | −3.223168E−01 |
| | A12 | 1.500133E−01 |
| | A14 | −2.880220E−02 |
| | A16 | 0.000000E+00 |
| | A18 | 0.000000E+00 |
| | A20 | 0.000000E+00 |

Phase structures are superposed on areas $(2\text{-}1)^{th}$ to $(2\text{-}5)^{th}$, and a light flux with λ1 which has passed through the $(2\text{-}1)^{th}$ area is given an optical path difference of 5×λ1 (nm) in the $(2\text{-}2)^{th}$ area, whereby, the phase of the light flux is delayed by 2π×5 (rad) in conversion to phase difference. In addition, since optical path differences of 10×λ1 (nm), 5×λ1 (nm) and 0×λ1 (nm) are given to the light flux with wavelength λ1 transmitted through the $(2\text{-}1)^{th}$ surface, on the $(2\text{-}3)^{th}$ surface, $(2\text{-}4)^{th}$ surface and $(2\text{-}5)^{th}$ surface, the phase of the light flux is delayed respectively by 2π10 (rad), 2π×5 (rad) and 2π×0 (rad), in conversion to phase difference. Further, since optical path differences of 3×λ2 (nm), 6×λ2 (nm), 3×λ2 (nm) and 0×λ2 (nm) are given to the light flux with wavelength λ2 transmitted through the $(2\text{-}1)^{th}$ surface, on the $(2\text{-}2)^{th}$ surface, $(2\text{-}3)^{th}$ surface, $(2\text{-}4)^{th}$ surface and $(2\text{-}5)^{th}$ surface, the phase of the light flux is delayed respectively by 2π×3 (rad), 2π×6 (rad), 2π×3 (rad) and 2π×0 (rad), in conversion to phase difference. Namely, an optical path difference added by one step of the diffractive structure to a light flux with each wavelength is 2040 nm for the first wavelength λ1, and 1974 nm for the second wavelength λ2, which means that an optical path difference in substantially the same amount is given to the light flux with any wavelength. Incidentally, in the present example, the direction of the blaze structure is changed once from the negative direction to the positive direction as its position gets away from the optical axis (see FIG. 5).

On the other hand, an optical surface facing an optical disc (3$^{rd}$ surface) is in a form of an aspheric surface. In the objective lens of this kind in Example 2, an amount of change of spherical aberration in the case where the first wavelength λ1 is changed by +5 nm, is 0.035 λ1RMS for 3$^{rd}$ order component and is 0.014 λ1RMS for higher order component, which means that the higher order component is declined, for the amount of change in the case where an phase structure is not superposed on a diffractive structure on the second surface (0.020 λ1RMS for 3$^{rd}$ order component and 0.032 λRMS for higher order component). Incidentally, in this case, "higher order component" is made to be a square root of sum of squares for 5$^{th}$ order components and 7$^{th}$ order components.

Example 3

Example 3 is represented by an objective lens made of glass (S-BSM14 made by OHARA Co., LTD.) suitable for an optical pickup apparatus shown in FIG. 6. Tables 3-1 to 3-3 shows lens data of Example 3 (including design wavelength, focal length, image side numerical aperture and magnification). An optical surface facing the light source is composed of 6 areas, in the order where the area closest to the optical axis comes first, including (2-1) surface including an optical axis, and other surfaces surrounding the $(2\text{-}1)^{th}$ surface including $(2\text{-}2)^{th}$ surface, $(2\text{-}3)^{th}$ surface, $(2\text{-}4)^{th}$ surface, $(2\text{-}5)^{th}$ surface, and $(2\text{-}6)^{th}$ surface. An area including the $(2\text{-}1)^{th}$ to $(2\text{-}5)^{th}$ areas corresponds to the central area and the $(2\text{-}6)^{th}$ area corresponds to a peripheral area. On each of the $(2\text{-}1)^{th}$ $(2\text{-}5)^{th}$ areas, there is formed a diffractive structure of blaze wavelength λB: 490 nm, and its diffraction order is first order for BD and for DVD, while, its diffraction efficiency is 85% for BD and 79% for DVD. The (2-6) area is of the aspheric surface form.

TABLE 3-1

(Example 3)

| | | |
|---|---|---|
| Design wavelength | λ1: 408 nm | λ2: 658 nm |
| Focal length | f1: 1.778 nm | f2: 1.828 nm |
| Numerical aperture | NA1: 0.85 | NA2: 0.67 |
| Magnification | m1: 0 | m2: 0 |
| Effective diameter of $2^{nd}$ surface | φ3.00 mm | φ2.36 mm |

(Paraxial data)

| *1 | Ri | di (408 nm) | ni (408 nm) | di (658 nm) | ni (658 nm) | nd | vd | *2 |
|---|---|---|---|---|---|---|---|---|
| 0 | ∞ | | | ∞ | | | | *3 |
| 1 | | 0 | | 0 | | | | *4 |
| 2 | *7 | 2.090 | 1.619312 | 2.090 | 1.600017 | 1.603110 | 60.70 | *5 |
| 3 | −3.643170 | 0.569 | | 0.284 | | | | |
| 4 | ∞ | 0.0875 | 1.618381 | 0.6 | 1.577286 | 1.583000 | 29.90 | *6 |
| 5 | ∞ | | | | | | | |

*1: $i^{th}$ surface,
*2: Remarks,
*3: Point of emission,
*4: Diaphragm (aperture diameter: 3.00 mm),
*5: Objective lens,
*6: Protective layer,
*7: Refer to the below

TABLE 3-2

(The $2^{nd}$ surface data)

| | | Surface No. | | |
|---|---|---|---|---|
| | | 2-1 | 2-2 | 2-3 |
| Range | | h ≤ 0.75475 | 0.75475 ≤ h ≤ 0.92759 | 0.92759 ≤ h ≤ 1.02511 |
| Curvature radius | R | 1.231366E+00 | 1.230265E+00 | 1.227847E+00 |
| Conic constant, | K | −6.819532E−01 | −7.002303E−01 | −7.340774E−01 |
| Offset quantities of aspheric surface, Aspheric surface coefficient | A0 | 0.000000E+00 | 3.275934E−03 | 5.998017E−03 |
| | A4 | 1.377735E−02 | 1.530351E−02 | 1.828797E−02 |
| | A6 | −8.376391E−03 | −8.376391E−03 | −8.376391E−03 |
| | A8 | 1.209849E−02 | 1.209849E−02 | 1.209849E−02 |
| | A10 | −6.317303E−03 | −6.317303E−03 | −6.317303E−03 |
| | A12 | −2.247148E−03 | −2.247148E−03 | −2.247148E−03 |
| | A14 | 6.179933E−03 | 6.179933E−03 | 6.179933E−03 |
| | A16 | −4.593168E−03 | −4.593168E−03 | −4.593168E−03 |
| | A18 | 1.692057E−03 | 1.692057E−03 | 1.692057E−03 |
| | A20 | −2.724485E−04 | −2.724485E−04 | −2.724485E−04 |
| Blaze wavelength λB | | 490 nm | 490 nm | 490 nm |
| Diffraction order dor | | 1 | 1 | 1 |
| Diffractive surface coefficients | C2 | 0.000000E+00 | 0.000000E+00 | 0.000000E+00 |
| | C4 | −2.485454E−03 | −2.485454E−03 | −2.485454E−03 |
| | C6 | −4.604638E−03 | −4.604638E−03 | −4.604638E−03 |
| | C8 | 2.224707E−03 | 2.224707E−03 | 2.224707E−03 |
| | C10 | −7.764238E−04 | −7.764238E−04 | −7.764238E−04 |

| | | Surface No. | | |
|---|---|---|---|---|
| | | 2-4 | 2-5 | 2-6 |
| Range | | 1.02511 ≤ h ≤ 1.10641 | 1.10641 ≤ h ≤ 1.18483 | 1.18483 ≤ h |
| Curvature radius | R | 1.227261E+00 | 1.231479E+00 | 1.230538E+00 |
| Conic constant, | K | −6.970425E−01 | −6.578121E−01 | −6.495656E−01 |
| Offset quantities of aspheric surface, Aspheric surface coefficient | A0 | 9.712138E−03 | 1.335168E−02 | −1.560000E−03 |
| | A4 | 1.508777E−02 | 1.520618E−02 | 1.699980E−02 |
| | A6 | −8.353219E−03 | −9.951917E−03 | −2.696142E−03 |
| | A8 | 1.209849E−02 | 1.209849E−02 | 1.049653E−02 |
| | A10 | −6.317303E−03 | −6.317303E−03 | −9.618427E−03 |
| | A12 | −2.247148E−03 | −2.247148E−03 | 2.693698E−03 |
| | A14 | 6.179933E−03 | 6.179933E−03 | 3.957311E−03 |
| | A16 | −4.593168E−03 | −4.593168E−03 | −4.339652E−03 |
| | A18 | 1.692057E−03 | 1.692057E−03 | 1.777177E−03 |
| | A20 | −2.724485E−04 | −2.724485E−04 | −2.796646E−04 |
| Blaze wavelength λB | | 490 nm | 490 nm | |
| Diffraction order dor | | 1 | 1 | |
| Diffractive | C2 | 0.000000E+00 | 0.000000E+00 | |

TABLE 3-2-continued (The $2^{nd}$ surface data)

| surface coefficients | C4 | −2.485454E−03 | −2.485454E−03 |
|---|---|---|---|
| | C6 | −4.604638E−03 | −4.604638E−03 |
| | C8 | 2.224707E−03 | 2.224707E−03 |
| | C10 | −7.764238E−04 | −7.764238E−04 |

TABLE 3-3

($3^{rd}$ surface data)

| | | Surface No. 3 |
|---|---|---|
| Conic constant | K | −8.205457E+01 |
| Aspheric surface coefficient | A0 | 0.000000E+00 |
| | A4 | 1.772974E−01 |
| | A6 | −3.159789E−01 |
| | A8 | 3.926434E−01 |
| | A10 | −3.480322E−01 |
| | A12 | 1.708458E−01 |
| | A14 | −3.437101E−02 |
| | A16 | 0.000000E−00 |
| | A18 | 0.000000E+00 |
| | A20 | 0.000000E+00 |

Phase structures are superposed on $(2\text{-}1)^{th}$ to $(2\text{-}5)^{th}$ areas and a light flux with λ1 which has passed through the $(2\text{-}1)^{th}$ area is given an optical path difference of $-5\times\lambda 1$ (nm) in the $(2\text{-}2)^{th}$ area, whereby, the phase of the light flux is advanced by $2\pi\times 5$ (rad) in conversion to phase difference. In addition, since optical path differences of $-10\times\lambda 1$ (nm), $-15\times\lambda 1$ (nm) and $-20\times\lambda 1$ (nm) are given to the light flux with wavelength λ1 transmitted through the $(2\text{-}1)^{th}$ surface, on the $(2\text{-}3)^{th}$ surface, $(2\text{-}4)^{th}$ surface and $(2\text{-}5)^{th}$ surface, the phase of the light flux is advanced respectively by $2\pi\times 10$ (rad), $2\pi\times 15$ (rad) and $2\pi\times 20$ (rad), in conversion to phase difference. Further, since optical path differences of $-3\times\lambda 2$ (nm), $-6\times\lambda 2$ (nm), $-9\times\lambda 2$ (nm) and $-12\times\lambda 2$ (nm) are given to the light flux with wavelength λ2 transmitted through the $(2\text{-}1)^{th}$ surface, on the $(2\text{-}2)^{th}$ surface, $(2\text{-}3)^{th}$ surface, $(2\text{-}4)^{th}$ surface and $(2\text{-}5)^{th}$ surface, the phase of the light flux is advanced respectively by $2\pi\times 3$ (rad), $2\pi\times 6$ (rad), $2\pi\times 9$ (rad) and $2\pi\times 12$ (rad), in conversion to phase difference. Namely, an optical path difference added by one step of the phase structure to a light flux with each wavelength is 2040 nm for the first wavelength λ1, and 1974 nm for the second wavelength λ2, which means that an optical path difference in substantially the same amount is given to the light flux with any wavelength. Incidentally, in the present example, the direction of the blaze structure is positive and is constant in the central area (see FIG. 4).

On the other hand, an optical surface facing an optical disc ($3^{rd}$ surface) is in a form of an aspheric surface. In the objective lens of this kind in Example 3, an amount of change of spherical aberration in the case where the first wavelength λ1 is changed by +5 nm, is 0.006 λ1RMS for $3^{rd}$ order component and is 0.014 λ1RMS for higher order component, which means that the higher order component is declined, for the amount of change in the case where an phase structure is not superposed on a diffractive structure on the second surface (0.085 λ1RMS for $3^{rd}$ order component and 0.042 λRMS for higher order component). Incidentally, in this case, "higher order component" is made to be a square root of sum of squares for $5^{th}$ order components and $7^{th}$ order components.

Meantime, in the objective lens in each of Example 1 to Example 3, when an area-weighted average value within an effective diameter for diffraction efficiency for the first wavelength λ1 is calculated, the calculated value is 90.7%, and high use efficiency can be obtained for BD which is required to have recording and/or reproducing at high speed.

Further, in the objective lens in each of Example 1-Example 3, blaze wavelength λB of the diffractive structure was made to be 490 nm. However, by changing the blaze wavelength λB without being limited to 490 nm, it is possible to change properly a balance of diffraction efficiency between the first wavelength λ1 and the second wavelength λ2.

Furthermore, although the above examples shows several cases in which the first optical path difference providing structure is a diffractive structure and the second optical path difference providing structure is a phase structure, these examples do not limit the scopes of the present invention. There is provided another example such as an superimposed structure superimposed a first optical path difference providing structure and a second optical path difference providing structure, where the first optical path difference providing structure is a diffractive structure whose diffracted light flux with the maximum diffraction efficiency for a light flux with a first wavelength λ1 is a third order diffracted light flux and whose diffracted light flux with the maximum diffraction efficiency for a light flux with a second wavelength λ2 is a second order diffracted light flux; and the second optical path difference providing structure is a phase structure providing substantially 5 times optical path difference of the first wavelength λ1 for a light flux with a first wavelength λ1, and providing substantially 3 times optical path difference of the second wavelength λ2 for a light flux with a second wavelength λ1.

There is also provided a preferred another example such as an superimposed structure superimposed a first optical path difference providing structure and a second optical path difference providing structure, where the first optical path difference providing structure is a phase structure providing substantially 5 times optical path difference of the first wavelength λ1 for a light flux with a first wavelength λ1, and providing substantially 3 times optical path difference of the second wavelength λ2 for a light flux with a second wavelength λ2; and the second optical path difference providing structure is a diffractive structure whose diffracted light flux with the maximum diffraction efficiency for a light flux with a first wavelength λ1 is a second order diffracted light flux and whose diffracted light flux with the maximum diffraction efficiency for a light flux with a second wavelength λ2 is a first order diffracted light flux.

Further, the invention can also applied to an objective lens for high density optical discs including not only BD but also HD, and effects similar to those mentioned above can be obtained.

What is claimed is:
1. An objective lens used for an optical pickup apparatus comprising:
   at least one lens having a power; and
   a superimposed structure on a surface of the at least one lens in which a first optical path difference providing structure and a second optical path difference providing structure are superimposed, wherein the first optical path difference providing structure changes spherical aberration in an under-corrected direction when a wavelength of an incident light flux becomes longer, the first optical path difference providing structure comprising a blaze structure, and wherein the second optical path difference providing structure changes the spherical aberration in an over-corrected direction when the wavelength of the incident light flux becomes longer, the second optical path difference providing structure comprising a blaze structure.

2. The objective lens of claim 1,
wherein the surface of the at least one lens comprises:
an area where the superimposed structure is formed; and
an area where the superimposed structure is not formed.

3. The objective lens of claim 1,
wherein the area where the superimposed structure is not formed is an aspheric surface.

4. The objective lens of claim 2,
wherein the surface of the at least one lens comprises:
a central area including an optical axis; and
a peripheral area surrounding the central area, and the superimposed structure is formed on the central area.

5. The objective lens of claim 1,
wherein the surface of the at least one lens faces a light source side when the objective lens is provided in the optical pickup apparatus.

6. The objective lens of claim 1,
wherein the surface of the at least one lens is a curvature surface.

7. The objective lens of claim 1,
wherein another surface of the at least one lens is an aspheric surface.

8. The objective lens of claim 1,
wherein when an information recording medium is arranged so as to face the optical pickup apparatus, the at least one lens is arranged at a closest position to an information recording medium.

9. The objective lens of claim 1,
wherein the objective lens is a single lens structure composed of the at least one lens.

10. The objective lens of claim 1,
wherein the objective lens is used for the optical pickup apparatus, the optical pickup apparatus comprising:
a first light source for emitting a first light flux with a first wavelength of $\lambda 1$;
a second light source for emitting a second light flux with a second wavelength of $\lambda 2$;
a light converging optical system comprising the objective lens; and
a photodetector,
wherein the optical pickup apparatus records and/or reproduces information for a first optical information recording medium having a protective layer with a thickness of t1 using the first light flux with the first wavelength of $\lambda 1$ emitted by the first light source, and
the optical pickup apparatus records and/or reproduces information for a second optical information recording medium having a protective layer with a thickness of t2 (t1≦t2) using the second light flux with the second wavelength of $\lambda 2$ ($\lambda 1 \leq \lambda 2$) emitted by the second light source.

11. The objective lens of claim 1,
wherein the first optical path difference providing structure is a diffractive structure.

12. The objective lens of claim 10,
wherein the first optical path difference providing structure is a diffractive structure in which a diffraction order providing a maximum diffraction efficiency for the first light flux entering thereon is equal to a diffraction order providing a maximum diffraction efficiency for the second light flux entering thereon, and
the second optical path difference providing structure is a phase structure providing a same amount of optical path difference to each of the first light flux and the second light flux.

13. The objective lens of claim 12,
wherein one ring-shaped zone of the phase structure comprises an integer number being equal to or more than an integer number of one ring-shaped zone of the diffractive structure.

14. The objective lens of claim 12,
wherein the diffraction order is one; and
a blaze wavelength $\lambda B$ of the diffractive structure satisfies $\lambda 1 < \lambda B < \lambda 2$.

15. The objective lens of claim 12, wherein:
380 nm $< \lambda <$ 420 nm; and
630 nm $< \lambda <$ 680 nm.

16. The objective lens of claim 15, wherein when NA1 is a numerical aperture of the objective lens for recording and/or reproducing information on the first optical information recording medium and NA2 is a numerical aperture of the objective lens for recording and/or reproducing information on the second optical information recording medium, an area within the numerical aperture NA2 comprises the superimposed structure, and
a blaze wavelength $\lambda B$ of the diffractive structure, the numerical aperture NA1, and the numerical aperture NA2 satisfy:
$1.15 \times \lambda 1 < \lambda B << 0.85 \times \lambda 2$ and
NA2/NA1 <0.8.

17. The objective lens of claim 15, wherein the same amount of optical path difference is substantially 5 times as long as the first wavelength $\lambda 1$ for the first light flux, and is substantially 3 times as long as the second wavelength $\lambda 2$ for the second light flux.

18. The objective lens of claim 11,
wherein the diffractive structure comprises a blaze structure whose direction switches at least one time from a negative direction to a positive direction at a farther position from an optical axis.

19. The objective lens of claim 12,
wherein the diffractive structure comprises a blaze structure whose direction switches at least one time from a negative direction to a positive direction at a farther position from an optical axis.

20. The objective lens of claim 11,
wherein the diffractive structure comprises a blaze structure with a positive direction.

21. The objective lens of claim 12,
wherein the diffractive structure comprises a blaze structure with a positive direction.

22. The objective lens of claim 10,
wherein the first optical path difference providing structure is a diffractive structure in which a diffraction order providing a maximum diffraction efficiency for the first light flux entering thereon is different from a diffraction order providing a maximum diffraction efficiency for the second light flux entering thereon, and
the second optical path difference providing structure is a phase structure providing a same optical path difference to each of the first light flux and the second light flux.

23. The objective lens of claim 22,
wherein the diffraction order providing the maximum diffraction efficiency for the first light flux is 3, and
the diffraction order providing the maximum diffraction efficiency for the second light flux is 2.

24. The objective lens of claim 22,
wherein the same optical path difference is substantially 5 times as long as the first wavelength $\lambda 1$ for the first light flux, and is substantially 3 times as long as the second wavelength $\lambda 2$ for the second light flux.

25. The objective lens of claim 1,
wherein the second optical path difference providing structure is a diffractive structure.

26. The objective lens of claim 25,
wherein the second optical path difference providing structure is a diffractive structure in which a diffraction order providing a maximum diffraction efficiency for the first light flux entering thereon is different from a diffraction order providing a maximum diffraction efficiency for the second light flux entering thereon, and
the first optical path difference providing structure is a phase structure providing a same optical path difference to each of the first light flux and the second light flux.

27. The objective lens of claim 26,
wherein the diffraction order providing the maximum diffraction efficiency for the first light flux is 2, and
the diffraction order providing the maximum diffraction efficiency for the second light flux is 1.

28. The objective lens of claim 26,
wherein the same optical path difference is substantially 5 times as long as the first wavelength $\lambda 1$ for the first light flux, and is substantially 3 times as long as the second wavelength $\lambda 2$ for the second light flux.

29. The objective lens of claim 1,
wherein the at least one lens is a glass lens.

30. The objective lens of claim 1,
wherein the at least one lens is formed by cementing a resin layer comprising the superimposed structure on a glass element.

31. An optical pickup apparatus comprising:
a light source;
a photodetector; and
an objective lens for an optical pickup apparatus comprising:
   at least one lens having a power; and
   a superimposed structure on a surface of the at least one lens in which a first optical path difference providing structure and a second optical path difference providing structure are superimposed,
wherein the first optical path difference providing structure changes spherical aberration in an under-corrected direction when a wavelength of an incident light flux becomes longer, the first optical path difference providing structure comprises a blaze structure, and
wherein the second optical path difference providing structure changes the spherical aberration in an over-corrected direction when the wavelength of the incident light flux becomes longer, the second optical path difference providing structure comprises a blaze structure.

32. An optical information recording and/or reproducing apparatus comprising an optical pickup apparatus comprising:
a light source;
a photodetector; and
an objective lens for an optical pickup apparatus comprising:
   at least one lens having a power; and
   a superimposed structure on a surface of the at least one lens in which a first optical path difference providing structure and a second optical path difference providing structure are superimposed,
wherein the first optical path difference providing structure changes spherical aberration in an under-corrected direction when a wavelength of an incident light flux becomes longer, the first optical path difference providing structure comprising a blaze structure, and
wherein the second optical path difference providing structure changes the spherical aberration in an over-corrected direction when the wavelength of the incident light flux becomes longer, the second optical path difference providing structure comprising a blaze structure.

* * * * *